United States Patent
Kon et al.

(10) Patent No.: US 11,436,832 B2
(45) Date of Patent: Sep. 6, 2022

(54) LIVING SKIN TISSUE TRACKING IN VIDEO STREAM

(71) Applicant: SENSORITY LTD., Ashdod (IL)

(72) Inventors: Ekaterina Kon, Ashdod (IL); Bar Mordehai, Bet-Arye (IL); Dmitry Goldenberg, Ashdod (IL)

(73) Assignee: SENSORITY LTD., Ashdod (IL)

( * ) Notice: Subject to any disclaimer, the term of this patent is extended or adjusted under 35 U.S.C. 154(b) by 0 days.

(21) Appl. No.: 17/029,398

(22) Filed: Sep. 23, 2020

(65) Prior Publication Data

US 2021/0089786 A1  Mar. 25, 2021

Related U.S. Application Data

(60) Provisional application No. 62/904,035, filed on Sep. 23, 2019.

(51) Int. Cl.
| | |
|---|---|
| *G06K 9/00* | (2022.01) |
| *G06V 20/40* | (2022.01) |
| *G06T 7/00* | (2017.01) |
| *G06K 9/62* | (2022.01) |
| *G06T 7/90* | (2017.01) |
| *G06V 10/56* | (2022.01) |
| *G06V 10/20* | (2022.01) |

(52) U.S. Cl.
CPC ........... *G06V 20/46* (2022.01); *G06K 9/6215* (2013.01); *G06T 7/0012* (2013.01); *G06T 7/90* (2017.01); *G06V 10/255* (2022.01); *G06V 10/56* (2022.01); *G06V 20/49* (2022.01); *G06T 2207/10016* (2013.01); *G06T 2207/20081* (2013.01); *G06T 2207/30088* (2013.01)

(58) Field of Classification Search
None
See application file for complete search history.

(56) References Cited

U.S. PATENT DOCUMENTS

| | | | |
|---|---|---|---|
| 9,940,753 B1* | 4/2018 | Grundhofer | G06T 11/00 |
| 9,980,658 B2* | 5/2018 | Wang | G06K 9/34 |
| 10,176,377 B2* | 1/2019 | Thavalengal | G06K 9/6289 |

(Continued)

OTHER PUBLICATIONS

Zhang et al., "Face liveness detection by learning multispectral reflectance distributions", 2011 IEEE International Conference on Automatic Face & Gesture Recognition (Year: 2011).*

(Continued)

*Primary Examiner* — Soo Jin Park
(74) *Attorney, Agent, or Firm* — The Roy Gross Law Firm, LLC; Roy Gross

(57) ABSTRACT

A method comprising: receiving, as input, a video sequence comprising a plurality of frames and depicting a scene; detecting, in each of said frames, one or more regions of interest (ROI) associated with an object in said scene; extracting, from each of said ROIs with respect to all of said frames, a feature set representing spectral reflectance; at a training stage, train a machine learning classifier on a training set comprising: (i) all of said feature sets, and (ii) labels indicating whether each of said ROIs depicts living skin tissue; and at an inference stage, applying said trained machine learning classifier to a target feature set extracted from a target ROI detected in a target video sequence, to determine whether said ROI depicts living skin tissue.

11 Claims, 36 Drawing Sheets

(56) References Cited

U.S. PATENT DOCUMENTS

| | | | | |
|---|---|---|---|---|
| 10,912,516 B2* | 2/2021 | Uchida | ................ | A61B 5/0261 |
| 2019/0102608 A1* | 4/2019 | Wang | ................ | H04N 5/23219 |
| 2020/0334450 A1* | 10/2020 | Shen | ................ | G06K 9/00221 |

OTHER PUBLICATIONS

Wang, W., "Robust and automatic remote photoplethysmography" Eindhoven University of Technology: Technische Universiteit Eindhoven, Oct. 23, 2017.

* cited by examiner

LIVING SKIN TISSUE TRACKING IN VIDEO STREAM

CROSS REFERENCE TO RELATED APPLICATIONS

This application claims the benefit of priority under 35 U.S.C. § 119(e) of U.S. Provisional Application No. 62/904,035, filed on Sep. 23, 2019. The contents of which are all incorporated by reference as if fully set forth herein in their entirety.

BACKGROUND

This invention relates to the field of machine learning.

Within the field of computing, many scenarios involve identifying individuals using one or more biometrics, such as based on fingerprints, iris recognition, facial recognition, and the like. Biometrics-based identification may be used as a primary mode of authentication, to log in and/or access, e.g., a computer system or device.

In the area of facial recognition, the possibility of using an image as a stand-in for a live human increases the risk of spoof attacks. This makes the ability to correctly detect living skin tissue in image and/or facial recognition application a crucial step.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program code, the program code executable by the at least one hardware processor to: receive, as input, a video sequence comprising a plurality of frames and depicting a scene, detect, in each of the frames, one or more regions of interest (ROI) associated with an object in the scene, extract, from each of the ROIs with respect to all of the frames, a feature set representing spectral reflectance, at a training stage, train a machine learning classifier on a training set comprising: (i) all of the feature sets, and (ii) labels indicating whether each of the ROIs depicts living skin tissue, and at an inference stage, apply the trained machine learning classifier to a target feature set extracted from a target ROI detected in a target video sequence, to determine whether the ROI depicts living skin tissue.

There is also provided, in an embodiment, a method comprising: receiving, as input, a video sequence comprising a plurality of frames and depicting a scene; detecting, in each of the frames, one or more regions of interest (ROI) associated with an object in the scene; extracting, from each of the ROIs with respect to all of the frames, a feature set representing spectral reflectance; at a training stage, train a machine learning classifier on a training set comprising: (i) all of the feature sets, and (ii) labels indicating whether each of the ROIs depicts living skin tissue; and at an inference stage, applying the trained machine learning classifier to a target feature set extracted from a target ROI detected in a target video sequence, to determine whether the ROI depicts living skin tissue.

There is further provided, in an embodiment, a computer program product comprising a non-transitory computer-readable storage medium having program code embodied therewith, the program code executable by at least one hardware processor to: receive, as input, a video sequence comprising a plurality of frames and depicting a scene; detect, in each of the frames, one or more regions of interest (ROI) associated with an object in the scene; extract, from each of the ROIs with respect to all of the frames, a feature set representing spectral reflectance, at a training stage, train a machine learning classifier on a training set comprising: (i) all of the feature sets, and (ii) labels indicating whether each of the ROIs depicts living skin tissue; and at an inference stage, apply the trained machine learning classifier to a target feature set extracted from a target ROI detected in a target video sequence, to determine whether the ROI depicts living skin tissue.

In some embodiments, each of the ROIs depicts at least one of: a human; part or whole of a human facial region; a skin region in a human; and a background region in the scene.

In some embodiments, each of the ROIs is further segmented into a plurality of segments based on one of: pixel similarity parameter, superpixel methods, and a fixed grid.

In some embodiments, the segments are tracked in the video sequence.

In some embodiments, the extracting comprises calculating image data values in at least one color representation model selected from the group consisting of: RGB (red-green-blue), HSV (hue, saturation, value), and YCbCr.

In some embodiments, the extracting further comprises calculating one or more features based on the image data values in the RGB color representation model, wherein the features comprise at least some of: frequency peak for at least one RGB channel; area under curve (AUC) for at least one RGB channel in the frequency domain; independent component analysis (ICA) for each RGB channel; maximum amplitude range for ICA in at least one RGB channel; AUC for ICA in at least one RGB channel in the time domain; frequency peak for ICA in at least one RGB channel, in the frequency domain; time index associated with an autocorrelation signal for at least one RGB channel; frequency peak associated with an autocorrelation signal for at least one RGB channel in the frequency domain.

In some embodiments, extracting further comprises calculating one or more features based on the image data values in the HSV color representation model, wherein the features comprise at least some of: Frequency peak for at least one HSV channel; area under curve (AUC) for at least one HSV channel in the frequency domain; maximum amplitude range for at least one HSV channel in the time domain; AUC for at least one HSV channel in the time domain; time index associated with an autocorrelation signal for at least one HSV channel; frequency peak associated with an autocorrelation signal for at least one HSV channel in the frequency domain; number of peaks above a specified threshold for at least one HSV channel in the time domain; and amplitude range for at least one HSV channel in the time domain.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally selected for convenience and clarity of presentation and are not necessarily shown to scale. The figures are listed below.

DETAILED DESCRIPTION

Figure 1A:
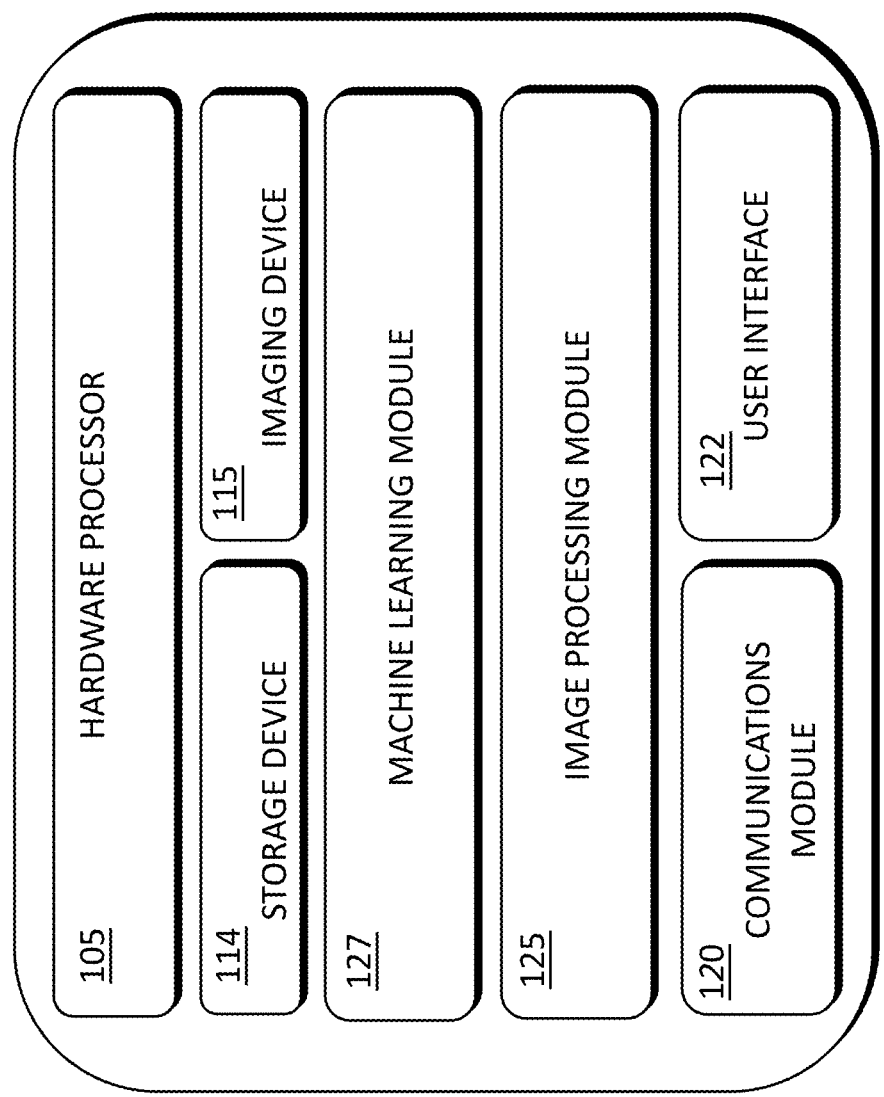
FIG. 1A is a block diagram of an exemplary system, according to an embodiment of the present invention.

Disclosed herein are a system, method and computer program product for automatically analyzing a video sequence of images depicting at least one object, and determining with a high degree of accuracy whether the object comprises living skin tissue.

In some embodiments, the present disclosure provides for determining whether a segment of image frames, e.g., a video stream, depicts an actual live bodily region (e.g., a face, facial features, another bodily part), as opposed to an image representation of a bodily region, based on detecting living skin tissue in the segment. As such, the present disclosure may be particularly useful in the area of user authentication and authorization with regard to access to computer systems or devices, based, e.g., on facial recognition or other biometrics checks.

In some embodiments, the present disclosure may be used to locate living subjects in a scene, by detecting image regions consistent with living skin tissue. One exemplary embodiment can be in the area of authentication techniques for devices (e.g., smartphones) based on, e.g., facial recognition. For example, in order to determine whether an image captured by a facial recognition security feature of the device, for the purpose of unlocking the device, actually depicts actual live human authorized to access the device, as opposed to an image representation of that human. The determination of whether a series of images, e.g., a video sequence or stream, presented for authentication or authorization purposes is of a live human can be based, at least in part, on the ability to detect living skin tissue in the images.

Accordingly, in some embodiments, the present disclosure provides for an algorithm configured to receive a video stream depicting an object (e.g., a human face), and determine whether this object comprises living skin tissue. Such a video stream may be produced by an imaging device, e.g., a video camera, directed at the object.

In some embodiments, a living skin tissue detection algorithm of the present disclosure is based, at least in part, on analyzing features associated with spectral reflectance intensity from an object in the video sequence, within one or more spectral bands. In some embodiments, at least some of the features are the result of various processing and transformation techniques applied to the spectral reflectance intensity values, such as, e.g., Fourier transforms and the like. The terms "spectrum" and "spectral band" as used herein refer to specific wavelength ranges of the electromagnetic spectrum within and/or near the visible spectrum.

In general, the metrics of spectral reflectance received from objects are dependent, at least in part, on the optical properties of the captured objects. Hence, the spectral reflectance received from living skin tissue is dependent on the optical properties of the living skin tissue, with particular regard to properties related to light absorption and scattering. When a light beam having a specific intensity and wavelength is radiated at a living skin tissue irradiation point, part of this light beam is diffusely reflected from the surface of the skin, while another part of the light beam passes through the surface into the tissue of the skin, and distributes there by means of multiple scattering. A fraction of this light scattered in the skin exits back out from the skin surface as visible scattered light, whereby the intensity of this scattered light depends on the distance of the exit point from the irradiation point as well as on the wavelength of the light radiated in. This dependence is caused by the optical material properties of the skin. For example, different spectral bands (with different wavelengths) of the spectrum have different absorption levels in the living skin tissue. Thus, green light penetrates deeper than red or blue light, and therefore the absorption levels, and hence reflectance, of the red and the blue bands are different. Thus, different absorption levels of different wavelengths can lead to different metrics of spectral reflectance. Accordingly, these unique optical properties may be used for detection and tracking purposes.

In some embodiments, the present algorithm may be configured to receive data representing a series of images, e.g., video stream, depicting a scene comprising one or more objects. In some embodiments, the algorithm may then be configured to detect one or more regions of interest (ROI) in the video sequence. In some exemplary cases, such ROIs may be objects in the scene, such as a human, a human face, a skin region in a human, and the like. In some embodiments, an ROI may comprise areas potentially associated with skin. In some embodiments, ROIs may further include other areas in the images, e.g., background. For example, ROI detection may be based, at least in part, on facial detection, wherein the face (excluding facial features such as eyes, etc.) may be considered as potentially associated with living skin tissue.

In some embodiments, once an ROI has been defined in a video sequence, the detected ROI may undergo a segmentation process, based, e.g., on pixel similarity parameters and/or another segmentation methodology. In some embodiments, the segments identified in the segmentation process may be utilized for tracking the object in the video sequence.

In some embodiments, the present disclosure may then provide for determining a set of values for each of the segments in the ROI, for example using an RGB (red-green-blue) color representation model, and/or other or additional models such as YCbCr, and HSV (hue, saturation, value). In some embodiments, the set of values may be derived along the duration of a time window within the video stream. In some embodiments, a variety of statistical and/or similar calculations may be applied to the derived image data values.

In some embodiments, the present algorithm may then be configured to extract a set of features from the image data values associated with a video stream. In some embodiments, the features may be spectral reflectance features derived directly form a one or a series of time-windows within a video sequence or stream. In some embodiments, some or all of the features represent spectral reflectance with respect to one or more ROIs within the image frames, e.g., a human, a human face, a skin region in a human, image background, etc.

In some embodiments, the present disclosure then provides for applying a trained machine learning classifier to the extracted features of a segment of the ROI, to determine whether the segment depicts living skin tissue.

In some embodiments, a machine learning classifier of the present disclosure can be trained using a training set comprising features extracted from a plurality of video sequences, wherein the sequences are associated with, e.g., a plurality of human subjects of different demographics, ages, sexes, skin tones, etc. In some embodiments, such sequences are taken using different imaging techniques, imaging equipment, from different distances and angles, using varying backgrounds and settings, and/or under different illumination and ambient conditions. In some embodiments, the training set may be labelled to indicate, e.g., whether or not each segment depicts living skin tissue.

In some embodiments, once a video sequence has been classified by the trained classifier of the present disclosure as depicting living skin tissue, the present algorithm may then be configured to track the segment over time in a received video stream.

The following discussion will focus primarily on applications of the present disclosure with respect to images acquired using RGB imaging techniques. However, the present disclosure may be implemented with respect to one or more other imaging techniques, including, e.g., monochrome imaging, near infrared (NIR), sort-wave infrared (SWIR), infrared (IR), ultraviolet (UV), multi spectral, hyperspectral, and/or any other and/or similar imaging techniques.

FIG. 1A is a block diagram of an exemplary system 100 according to an embodiment of the present invention. System 100 as described herein is only an exemplary embodiment of the present invention, and in practice may have more or fewer components than shown, may combine two or more of the components, or a may have a different configuration or arrangement of the components. The various components of system 100 may be implemented in hardware, software or a combination of both hardware and software. In various embodiments, system 100 may comprise a dedicated hardware device, or may form an addition to/or extension of an existing device.

System 100 may store in storage device 114 software instructions or components configured to operate a hardware processor 105 comprising such as hardware processor (also "hardware processor," "CPU," or simply "processor"). In some embodiments, the software components may include an operating system, including various software components and/or drivers for controlling and managing general system tasks (e.g., memory management, storage device control, power management, etc.) and facilitating communication between various hardware and software components.

In some embodiments, the software components of the system 100 may comprise an operating system, including various software components and/or drivers for controlling and managing general system tasks (e.g., memory management, storage system control, power management, etc.) and facilitating communication between various hardware and software components.

In some embodiments, system 100 may comprise a hardware processor 105, a communications module 120, a user interface 122, an imaging device 115, an image processing module 125, and a machine learning module 127.

In some embodiments, the imaging device 115 may comprise any one or more devices that capture a stream of images and represent them as data. Imaging device 115 may be optic-based, but may also include depth sensors, infrared imaging sensors, and the like. In some embodiments, imaging device 115 may be a Kinect or a similar motion sensing device, capable of, e.g., IR imaging. In some embodiments, imaging device 115 may be configured to detect RGB (red-green-blue) spectral bands. In other embodiments, imaging device 115 may be configured to detect at least one of monochrome, ultraviolet (UV), near infrared (NIR), short-wave infrared (SWIR), multiple spectral bands, and or in hyperspectral imaging techniques.

In some embodiments, the imaging device 115 comprises a digital imaging sensor selected from a group consisting of:

complementary metal-oxide-semiconductor (CMOS), charge-coupled device (CCD), Indium gallium arsenide (InGaAs), and polarization-sensitive sensor element.

In some cases, the produced data representing stream of images can be in a format of data operable by a computer device for diverse purposes such as displaying the data, storing the image data, editing the data, and the like. In some embodiments, the data may be used at the analysis process of the video sequence. In some embodiments, such data can be used to derive various information aspects, which can be utilized in a number of processes such as detecting region of interest, segmentation, feature calculation, and the like. In some embodiments, such information can refer to color channels, e.g., red, green and blue. In some embodiments, the color channels may be used to calculate various metrics such as the intensity levels of at least some of the wavelengths, levels of brightness of at least some of the color channels, and the like.

In some embodiments, the user interface 122 comprises one or more of a control panel for controlling system 100, buttons, display monitor, and/or speaker for providing audio commands. In some embodiments, system 100 includes one or more user input control devices, such as a physical or virtual joystick, mouse, and/or click wheel. In other variations, system 100 comprises one or more of peripheral interfaces, RF circuitry, audio circuitry, a microphone, an input/output (I/O) subsystem, other input or control devices, optical or other sensors, and an external port. Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments.

In some embodiments, the communications module 120 may be configured for connecting system 100 to a network, such as the internet, a local area network, a wide area network and/or a wireless network. In some embodiments, the communications module 120 facilitates communications with other devices over one or more external ports, and also includes various software components for handling data received by system 100. In some embodiments, the communications module 120 may be configured to enable communication between the machine learning module 127 and computerized processes, and/or data bases which may be reachable over the network.

In some embodiments, the image processing module 125 may be configured to receive video stream data, and process the data to extract and/or calculate a plurality of values and/or features derived from the data. In some embodiments, image processing module may be configured to perform at least some of object detection, image segmentation, and/or object tracking based on one or more image processing techniques. In some embodiments, the image processing module 125 may also be configured to calculate a plurality of features from the video stream data. In some embodiments, the features may represent various metrics derived from the video stream data, such as time domain, frequency domain, and/or other or similar features.

In some embodiments, the video stream data, values, and/or features extracted and/or calculated by image processing module 125 may be used to construct a training set for the training process of a machine learning classifier of the present disclosure. In some embodiments, the image processing module 125 may be configured to label calculated features associated with a video stream. In some embodiments, the process of labeling the features may involve user intervention which can be processed by the user interface 122. In some embodiments, the image processing module 125 may be configured to communicate with the machine learning module 127 for constructing the training sets required to train a classifier.

In some embodiments, the machine learning module 127 may be configured to train a machine learning classifier to detect living skin tissue in a video sequence. In some embodiments, the video sequence may be associated with features calculated from data produced by the image processing module 125. In some embodiments, the machine learning module 127 can be configured to apply a trained machine learning classifier to a set of calculated features to determine whether the video stream associated with the calculated features depicts living skin tissue.

Figure 1B:
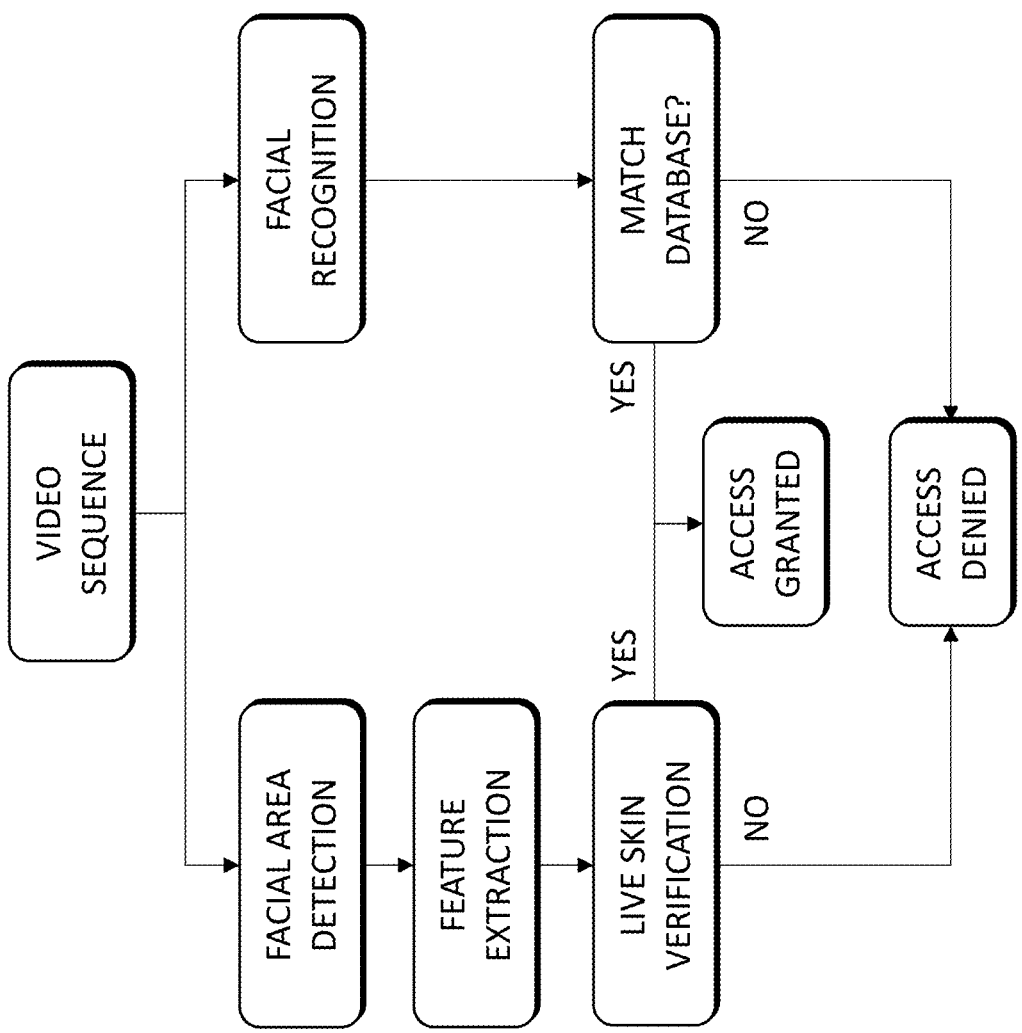
FIG. 1B is a flowchart of functional steps in a process for live-skin based user authentication, in accordance with some embodiments of the present invention.

As noted above, a potential use case of the present disclosure provides for access authentication based on detection of live human skin vs., e.g., a picture of a person's face. For example, this use case may be incorporated into biometric authentication and authorization systems. As can be seen in FIG. 1B, in some cases, system 100 may be configured to extract frames from a video. These frames go through a facial recognition procedure, e.g., against a provided database, to identify the person in question. Simultaneously, the present process provides for determining whether the images contain live human skin based on a machine learning verification. If both facial recognition and skin detection return positive values, then system 100 may grant access to the person in question, otherwise system 100 may deny access.

Process Overview

Figure 2:
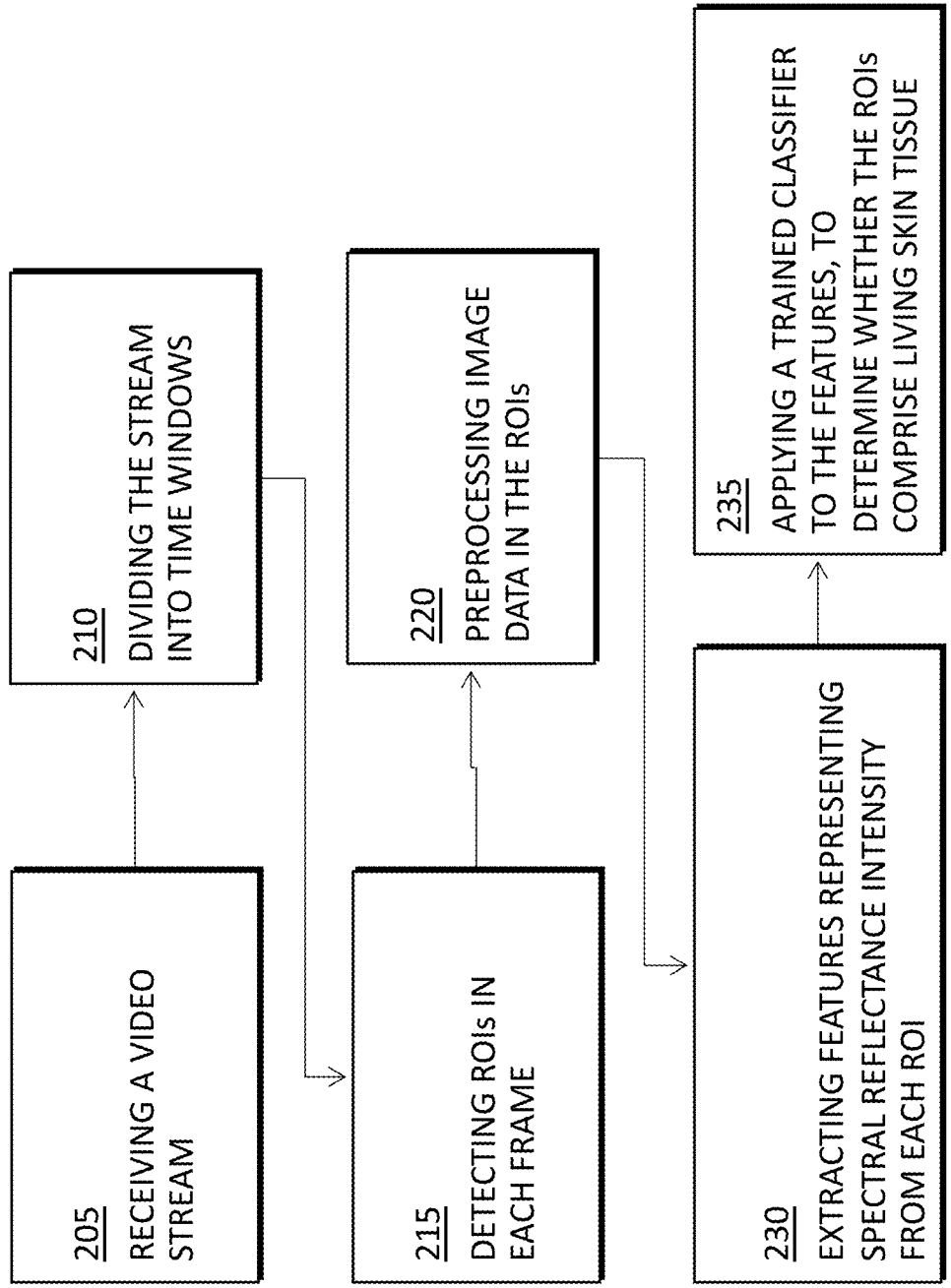
FIG. 2 is a flowchart of functional steps in a process to detect living skin tissue in a video sequence, in accordance with some embodiments of the present invention.

FIG. 2 is a flowchart of the functional steps in a process for detecting living skin tissue in a video sequence, in accordance with some embodiments of the present invention. At step 205, a video stream can be received by a system, such as system 100 in FIG. 1. In some embodiments, system 100 can be configured to receive such a video stream from an imaging device, e.g., imaging device 115. In some embodiments, the video stream may be received as an input from an external source, e.g., the video stream can be sent as an input from a storage device designed to manage a digital storage comprising video streams.

At step 210, the system may divide the video stream into time windows, e.g., by defining a plurality of video sequences having, e.g., a specified duration, such as a five-second duration. In such an exemplary case, the number of frames may be 126, for cases where the imaging device captures twenty-five (25) frames per second, wherein consecutive video sequences may have a 1-frame overlap. In some embodiments, at step 210, more than one sequence of frames may be selected from one video stream. For example, two or more sequences of five seconds each can be selected in one video stream.

At step 215, the image processing module 125 may be configured to detect one or more regions-of-interest (ROI) in some or all of the frames in the video sequence, wherein the ROIs are potentially associated with living skin tissue. In some embodiments, at step 215, image processing module 125 may be configured to perform facial detection, a head region detection, and/or other bodily region detection. In some embodiments, an ROI may comprise part of all of a facial region in the video sequence (e.g., with non-skin areas, such as eyes, extracted). In some embodiments, the ROIs may comprise a human, a human face, a skin region in a human, and the like. In some embodiments, an ROI may comprise areas potentially associated with skin. In some embodiments, ROIs may further include other areas in the images, e.g., background. In some embodiments, ROI detection may be performed by using any appropriate algorithms and/or methods.

In some embodiments, one or more of the detected ROIs may further undergo a segmentation process, e.g., by employing image processing module 125 in FIG. 1. In some embodiments, the segmentation process may employ diverse methods for partitioning regions in a frame into multiple segments. In some embodiments, algorithms for partitioning the ROI by a simple linear iterative clustering may be utilized for segmenting the ROI. For example, a technique defining clusters of super-pixels may be utilized for segmenting the ROI. In some embodiments, other techniques and/or methods may be used, e.g., techniques based on permanent segmentation, as further detailed below.

In some embodiments, the segments identified in the first frame of the sequence may also be tracked in subsequent frames throughout the sequence, as further detailed below. In some embodiments, tracking segments throughout a video sequence may be performed by, e.g., checking a center of mass adjustment and polygon shape adjustment between consecutive frames in the sequence. For example, if a current frame has smaller number of segments than a previous frame, missing one or more segments may be added at the same location as in the previous frame.

In some embodiments, at step 220, an image data preprocessing step may be performed, e.g., by employing image processing module 125 in FIG. 1, to derive relevant data with respect to at least some of the ROI. In some embodiments, the processing stage may comprise data derivation, data cleaning, data normalization, and/or additional similar operations with respect to the data.

At step 230, in some embodiments, the image data preprocessed in step 225 may be used for calculating a set of features. In some embodiments, a plurality of features represent spectral reflectance intensity, as further detailed below. In some embodiments, the present disclosure may then provide for determining a set of values for each of the segments in the ROI, for example using an RGB (red-green-blue) color representation model, and/or other or additional models such as HSV (hue, saturation, value), YCbCr, etc. In some embodiments, the set of values may be derived along the length of a time window within the video stream. In some embodiments, a variety of statistical and/or similar calculations may be applied to the derived image data values.

In some embodiments, at step 235, a trained machine learning algorithm may be applied to at least some of the features, as extracted at step 230, to determine whether a segment tracked in the video sequence depicts living skin tissue. In some embodiments, the prediction classification may be determined as, e.g., an average or median prediction of a specified time window, e.g., 2 seconds. In some embodiments, this method allows for error reduction in the classification process.

Image Data Preprocessing

In some embodiments, with reference back to step 225 in FIG. 2, an image data preprocessing stage may comprise at least some of data derivation, data cleaning, data normalization, and/or additional similar operations with respect to the image data.

In some embodiments, for each segment in the ROI in the video sequence, the present algorithm may be configured to calculate an average of the RGB image channels, e.g., in a segment of time windows with a duration of 5 seconds and/or at least 125 frames (at a frame rate of 25 fps) each.

In some embodiments, each time window comprises, e.g., 126 frames, wherein the time windows may comprise a moving time window with an overlap of one or more frames between windows.

In some embodiments, utilizing the color channels in the segment involves identifying the average value of each RGB channel in each tracked segment and/or tracked object. In some embodiments, calculating channel values is based on the following derivations:

$$R_{avg}(i) = \frac{1}{N} \sum_{c}^{Col} \sum_{r}^{Row} R_{c,r}(i), \qquad (1.1)$$

$$G_{avg}(i) = \frac{1}{N} \sum_{c}^{Col} \sum_{r}^{Row} G_{c,r}(i), \qquad (1.2)$$

$$B_{avg}(i) = \frac{1}{N} \sum_{c}^{Col} \sum_{r}^{Row} B_{c,r}(i). \qquad (1.3)$$

In such an exemplary case, r denotes the row and c denotes the column indexes that detect the segment boundaries, N denotes the total number of pixels of the segment corresponding to a specific frame i, and R, G and B denote the number of red, green and blue pixels respectively.

In some embodiments, a preprocessing stage of cleaning the data, e.g., noise reduction for each tracked segment, may be conducted. In one exemplary embodiment, cleaning the data may be processed by, e.g., normalizing the Red, Green, and Blue channels (in RGB Color model), by:

$$[r(i), g(i), b(i)] = \qquad (2)$$
$$\left\{ \frac{R(i)}{R(i)+G(i)+B(i)}, \frac{G(i)}{R(i)+G(i)+B(i)}, \frac{B(i)}{R(i)+G(i)+B(i)} \right\},$$

$i$ = frame index.

In some embodiments, wherein features may be derived in the frequency domain, data cleaning may comprise, e.g., reducing a DC offset in the data based on a mean amplitude of the signal waveform:

$$\text{filtered}_{DC} = \text{channel} - \text{mean}(\text{channel}), \text{channel} = r,g,b. \qquad (3)$$

In some embodiments, the preprocessing stage may further comprise applying, e.g., a bandpass filter and/or another method wherein such filter may be associated with a heart rate of a depicted human. In some embodiments, such bandpass filter has a frequency range of, e.g., 0.75-3.5 Hz, such as an Infinite Impulse Response (IIR) elliptic filter with bandpass ripple of 0.1 dB and stopband attenuation of 60 dB:

$$\text{signal\_band\_}rgb(c) = \text{filtered}_{DC}(c) * BP, c = \text{channel } r,g,b \qquad (4)$$

Spectral Reflectance Intensity Feature Extraction

With reference back to step 230 in FIG. 2, in some embodiments, a plurality of features can be extracted according to methods and formulas elaborated further below. In some other embodiments, additional and/or other calculation methods and formulas may be used. In some embodiments, the objective of the feature extraction step if to select a set of features which optimally predict living skin tissue in a video sequence.

RGB-Based Features: Frequency Domain

In some embodiments, a plurality of features representing spectral reflectance intensity in a video sequence may be calculated based on RGB values derived at step 225, as described above.

In some embodiments, such plurality of features may comprise features in the frequency domain. In some embodiments, zero-padding may be used to increase frequency resolution, e.g., by appending artificial zeros to the signal to obtain a denser frequency grid when applying a frequency transform. In some embodiments, zero padding may be based on, e.g., the number of individual frames in each time window under analysis:

$$\text{signal\_band\_z\_rgb}(c) = [\text{signal\_band\_rgb}(c); \text{zeros}(126, 1)], c = \quad (5)$$

$$= \text{channel } r, g, b$$

In some embodiments, a Fourier Transform may then be applied, and the magnitude of each RGB channel may be calculated:

$$\text{signal}_{F\_}rgb(c) = |\text{FFT}\{\text{signal\_band\_z}(c)\}|, c = \text{channel } r, g, b. \quad (6)$$

In some embodiments, a compatible frequency signal may also be created, by:

$$f = \text{linspace}(0, Fs, L), \quad (7)$$

where Fs corresponds to the FPs video, and L is the length of $\text{signal}_F$.

In some embodiments, for each window channel, the maximum magnitude of the $\text{signal}_F$ (Eq. 6) may be found, with the corresponding frequency:

$$\text{index} = \max(\text{signal}_{F\_}rgb(c)) \rightarrow \text{peak}_{F\_}rgb(c) = f(\text{index}), \quad (8)$$

$$c = \text{channel } r, g, b.$$

In some embodiments, frequency area-under-curve (AUC) may be calculated for each channel with respect to $\text{signal}_F$ as in (Eq. 6):

$$\text{AUC}_{f\_}rgb(c) = \int_{f=0.75}^{f=3.5} \text{signal}_F(c) \cdot \partial f, c = \text{channel } r, g, b. \quad (9)$$

In some embodiments, the values for the three channels may be summed:

$$\text{sum}_A UC_{f\_}gb = \Sigma_{c=1}^{3} \text{AUC}_{f\_}gb(c). \quad (10)$$

RGB-Based Features: Independent Component Analysis in the Time Domain

In some embodiments, one or more of the plurality of features may be based on independent component analysis (ICA) or principal component analysis (PCA). Because the RGB channels are a linear combination of independent sources, these channels contain several sources including noises and artifacts. By performing a decomposition of the channels, one or more relevant source components, e.g., those containing biological information associated with living skin tissue, may be isolated. Accordingly, in some embodiments, the following ICA formulas may be employed by the present algorithm:

$$\frac{\text{signal}_b\text{and}(c)}{\begin{pmatrix} \text{signal}_b\text{and}(r) \\ \text{signal}_b\text{and}(g) \\ \text{signal}_b\text{and}(b) \end{pmatrix}} = \quad (11)$$

-continued $$\overline{A} \cdot \begin{pmatrix} \dfrac{ICA_{comp}(n)}{ICA_{component1}} \\ ICA_{component2} \\ ICA_{component3} \end{pmatrix} \rightarrow ICA_{comp}(n) = \overline{A}^{-1} \cdot \text{signal\_band}(c),$$

where $\overline{A}$ is a 3×3 coefficient matrix.

In some embodiments, because the relevant contributing source components are unknown, the features may be calculated as a sum or a mean of the three channels features.

In some embodiments, maximum amplitude range is calculated for each channel:

$$\text{Max}_t = \max(\text{channel}),$$

$$\text{Min}_t = \min(\text{channel}) \rightarrow$$

$$\text{Amp}_t(n) = \text{Max}_t - \text{Min}_t \quad (12)$$

where channel is each: $ICA_{comp}(n)$, n=1, 2, 3, then, sum the results:

$$\text{sum\_Amp}_{t\_}ICA = \Sigma_{n=1}^{3} \text{Amp}_t(n). \quad (13)$$

In some embodiments, the AUC of the time domain absolute band after ICA ($ICA_{comp}(n)$) is calculated for each window channel:

$$\text{AUC}_{t\_}ICA(n) = \int_{t=0}^{t=5} |ICA_{comp}(n)| \cdot \partial t, n=1,2,3, \quad (14)$$

where the results are summed to find the maximum:

$$\text{sum\_AUC}_{t\_}ICA = \Sigma_{n=1}^{3} \text{AUC}_{t\_}ICA(n) \quad (15)$$

$$\text{max\_AUC}_{t\_}ICA = \max(\text{AUC}_{t\_}ICA). \quad (16)$$

RGB-Based Features: Independent Component Analysis in the Frequency Domain

In some embodiments, a maximum frequency peak can be calculated with respect to the ICA components. In some embodiments, first the component Fourier transform magnitude in the frequency domain is calculated by (Eq. 6) and then the maximum by (Eq. 8).

In some embodiments, the mean(*) of the three component peaks may then be calculated by:

$$\text{Mean\_ICA\_peak}_F = \text{mean}(ICA\_\text{peak}_F(n)), n=1,2,3. \quad (17)$$

In some embodiments, values other than mean, such as average, highest peak, and/or another value may be calculated.

RGB-Based Features: Auto-Correlation in the Time Domain and Frequency Domain

In some embodiments, under the assumption that the RGB signal channels as reflected from biological tissues are periodic, the periodic time be estimated by estimating an auto-correlation of signal value:

$$\text{Corr}_{channel}rgb(m) = E\{\text{channel}(n+m) \cdot \text{channel}(n)\}, \quad (18)$$

$$\text{channel} = \text{signal\_band\_}rgb(c),$$

where E denotes the expected value operator, and m is the lag. In some cases, the lag range can be equal to $$2 \cdot N - 1, N = \text{length(channel)},$$

such that m index is:

$$-N << m << N.$$

In some embodiments, the duration of the first peak of the autocorrelation value can be utilized for measuring the periodic time. Hence, for each channel, the autocorrelation value can be calculated by (Eq. 18), Then, the lag of $Corr_{channel\_}rgb(m)$ can be reduced to m≥0 for obtaining the first peak index for each correlated channel.

$$\text{first\_peak\_}t\_Corr\_rgb = \text{findpeaks}(Corr_{channel}(\text{lag}>0), \text{'first'}, 1) \quad (19)$$

RGB-Based Features: Auto-Correlation in the Time Domain

In some embodiments, the frequency of the highest magnitude peak of the autocorrelation signal value in the frequency domain can also be used for measuring the periodic time. In such cases, for each RGB channel the autocorrelation value can be calculated by (Eq. 18). Then, the lag of $Corr_{channel}(m)$ can be reduced to m≥0. Thus, the Fourier transform may be calculated by (Eq. 6), to get $signal_{F\_}Corr$.

In some embodiments, the maximum magnitude of $signal_{F\_}Corr$ and the corresponding frequency by (Eq. 8), to get the feature $F_{Peak\_}Corr\_rgb$.

HSV-Based Features

In some embodiments, features bases on the HSV (hue, saturation, value) color representation model may be added. In such embodiments, after calculating the normalized RGB channels (Eq. 2), the RGB signal is converted to the HSV space, e.g., using the relevant MATLAB function (rgb2hsv). In some embodiments, the HSV channels may be also cleaned based on (Eqs. 3, 4) to get signal_band=channel h, s, v.

HSV-Based Features: Frequency Domain

In some embodiments, HSV features may be based on calculating a Fourier transform for by (Eqs. 5, 6) to get $$signal_{F\_}hsv(c), c=\text{channel } h,s,v.$$

In some embodiments, (Eqs. 8, 9) may be used to calculate hue channel peak and AUC in the frequency domain: $peak_{F\_}hsv$ and $AUC_{f\_}hsv$.

HSV-Based Features: Frequency Domain

In some embodiments, (Eq. 12) may be used to calculate maximum amplitude range for each $signal_{band_{hsv(c)}}$, to get $Amp_{t_{hsv}}$.

In some embodiments, for each $signal_{band_{hsv(c)}}$, the Area Under the Curve (AUC) can be calculated from the time domain absolute value by (Eq. 14) to get $AUC_{t_{hsv}}$.

HSV-Based Features: Autocorrelation in the Time and Frequency Domains

In some embodiments, autocorrelation values for the HSV channels may be calculated by (Eq. 18) to get $Corr_{channel\_}hsv$.

In some embodiments, first peak time may be calculated for each $Corr_{channel\_}hsv$ by (Eq. 19) to get first_peak_t_Corr_hsv.

In some embodiments, for each $Corr_{channel\_}hsv$, the frequency peak may be calculated in the same way as the $F_{Peak\_}Corr\_rgb$ feature is calculated for the RGB channels. In some embodiments, (Eqs. 6, 8) may be used.

HSV-Based Features: Unique HSV Features in the Time Domain

In some embodiments, a background signal characterized by a plurality of signal peaks may be correlated with living skin tissue. Accordingly, a feature may be introduced to count the number of peaks above a threshold of, e.g., $10^{-3}$ for the HSV channel in signal_band_hsv, to get the feature num_of_peaks_hsv. In some embodiments, the threshold may be based on empirical testing.

In some embodiments, the background signal correlated with living skin tissue may be characterized by various amplitude ranges of the HSV channels. In some embodiments, a feature may be introduced to account for the maximal amplitude range without taking account of outliers. Accordingly, this calculation may be configured to find all signal peak amplitudes, and arrange them in a descending order. Then, the uppermost 75%-95% of values may be selected, and a median value may be calculated to get the feature range_hsv.

YCbCr Format

In some embodiments, additional features may be based on the YCbCr format. These features may be based on, e.g., ten (10) rules for facilitating the process of determining whether a segment of segments depicts living skin tissue. In some embodiments, each of the rules returns a value of one (e.g., true), or zero (e.g., false). In some embodiments, a process of summing up rule values score can be performed. In some embodiments, this feature can provide an indication to the scoring for each segment. In some embodiment, calculating the rules values may be using the RGB channels by (Eq. 1). In some embodiments, the RGB values may be converted to HSV values.

In some embodiments, the YCbCr rules may be defined according to table 1, measured in values of RGB color space:

TABLE 1

Feature Rules

| No. | Rule | False | True |
|---|---|---|---|
| 1 | 0 < H < 50 | 0 | 1 |
| 2 | 0.23 < s < 0.68 | 0 | 1 |
| 3 | R > 95 and G > 40 and B > 20 | 0 | 1 |
| 4 | R > G and R > B and R G > 15 | 0 | 1 |
| 5 | Cr > 135 and Cb > 85 and Y > 80 | 0 | 1 |
| 6 | Cr <= 1.5862*Cb + 20 | 0 | 1 |
| 7 | Cr >= 0.3448*Cb + 76.2069 | 0 | 1 |
| 8 | Cr >= −4.5652*Cb + 234.5652 | 0 | 1 |
| 9 | Cr <= −1.15*Cb + 301.75 | 0 | 1 |
| 10 | Cr <= −2.2857*Cb + 432.85 | 0 | 1 |
| | Total Score | 0 | 10 |

In some embodiments, a total score is assigned to this feature based on each of the rule values. In some embodiment, the score may be ten (10) in case all rules return a value of 'true.'

Features Summary

In some embodiments, the plurality of features selected for representing spectral reflectance intensity may comprise at least some of:

Frequency peak for the green channel;

The sum of the area under the curve (AUC) of the 3 RGB channels in the frequency domain;

Sum of the amplitudes of the 3 components, after applying ICA on the RGB

As may be appreciated by those skilled in the art, in real-life subject observation situations, several challenges emerge related to subject movement, lighting conditions, system latency, facial detection algorithms limitations, the quality of the obtained video, etc. For example, observed subjects may not remain in a static posture for the duration of the observation, so that, e.g., the facial region may not be fully visible at least some of the time. Accordingly, the predictive model of the present invention may be trained to adapt to a variety of situations and input variables.

In some embodiments, the training set may comprise a plurality of feature sets extracted form a plurality of video sequences observing subjects of different demographics, ages, sexes, skin tones, etc. In some embodiments, such video sequences are taken using different imaging techniques, imaging equipment, from different distances and angles, using varying backgrounds and settings, and/or under different illumination and ambient conditions. In some embodiments, the training set may be labelled to indicate, e.g., whether or not each segment depicts living skin tissue.

In some embodiments, at step 302, one or more ROIs may be detected in the video sequences. In some embodiments, the ROIs may comprise a human, a human face, a skin region in a human, and the like. In some embodiments, an ROI may comprise areas potentially associated with skin. In some embodiments, ROIs may further include other areas in the images, e.g., background regions. For example, ROI detection may be based, at least in part, on facial detection. In some embodiments, the ROIs may be segmented, e.g., to areas considered as potentially associated with living skin tissue. In some embodiments, the ROIs segments may be tracked throughout the video sequences.

In some embodiments, at step 305, a plurality of feature sets may be extracted from each of the ROIs. In some embodiments, the features calculated by the image processing module 125 can represent spectral reference intensities for each of the ROIs. In some embodiments, the calculated feature sets may represent spectral ranges for each of the ROIs.

In some embodiments, the plurality of features extracted at step 305 may comprise at least some of:
Frequency peak for the green channel;
The sum of the area under the curve (AUC) of the 3 RGB channels in the frequency domain;
Sum of the amplitudes of the 3 components, after applying ICA on the RGB channels;
Sum of the AUC in the time domain of the 3 absolute components, after applying ICA on the RGB channels;
Maximum of the AUC in the time domain between the 3 absolute components, after applying ICA on the RGB channels;
Mean of the frequency peak of the 3 components, after applying ICA and Fourier transform on the RGB channels;
Time index of the first peak for the green channel after calculation of an autocorrelation signal;
Frequency peak for the green channel, after calculation of an autocorrelation signal and Fourier transform;
Frequency peak for the hue channel in the HSV model;
AUC of the hue channel in the frequency domain;
Amplitudes of the hue channel in the HSV model in the time domain;
AUC of the absolute hue channel in the HSV model in the time domain;
Time index of the first peak for the hue channel in the HSV model, after calculation of an autocorrelation signal.
Frequency peak for the hue channel in the HSV model after calculation of an autocorrelation signal and Fourier transform;
The number of peaks above a threshold in the hue channel in the HSV model in the time domain;
The highest peak range in the hue channel in the HSV model in the time domain;
The number of rules that exists in the RGB, HSV and YCbCr format.

In some embodiments, additional and/or other features may be used, including:
Channel average:

$$c_{avg}, c = r, g, b: \_avg = \frac{1}{N} \sum_{i=1}^{N} \text{Channel}(i);$$

Channel standard deviation: $c_{std}$, $c=r,g,b$:

$$c\_std = \sqrt{\frac{1}{N-1} \sum_{i=1}^{N} \text{Channel}(i) - c\_avg};$$

Multiple Channel average: $c_n c_{m_{avg}}$, $c_{n/m}=r,g,b$. Calculate the feature for the same channel or between different channels:

$$c_n c_m\_avg = \frac{1}{N} \sum_{i=1}^{N} \text{Channel}_n(i) \cdot \text{Channel}_m(i);$$

Covariance between channels: $C_n c_{m_{cov}}$:

$$c_n c_m\_cov = \frac{1}{N-1} \sum_{i=1}^{N} (\text{Channel}_n(i) - c_n\_avg) \cdot (\text{Channel}_m(i) - c_m\_avg);$$

R_G_ratio:

$$R\_G = \frac{R-G}{R+G};$$

and
B_RG_ratio:

$$B\_RG = \frac{B}{R+G}.$$

In some embodiments, at step 310, a training set may be constructed, comprising (i) the feature sets extracted from each ROI (including, e.g., background regions) at step 305, and (ii) labels indicating whether a corresponding ROI depicts living skin tissue. In some embodiments, the process of labeling the features may be manual.

At step 315, the training set constructed at step 310 may be used to train a machine learning model, e.g., comprised in machine learning module 127 in FIG. 1. In some embodiments, machine learning module 127 may comprise one or more suitable machine learning algorithms, e.g., K-nearest neighbors (KNN), Random Forest trees, support vector machine (SVM), and/or Naive Bayes algorithms.

In some embodiments, the performance of the prediction model may be assessed using such parameters as:

$$\text{Sensitivity } (Se) = \frac{TP}{TP+FN};$$

$$\text{Positive Predictive Value } (PPV) = \frac{TP}{TP+FP};$$

$$\text{Specificity } (Sp) = \frac{TN}{TN+FP};$$

$$\text{Negative Predicitive Value } (NPV) = \frac{TN}{TN+FN}; \text{ and/or}$$

$$\text{Total Classification Accuracy (TCA)} = \frac{\text{the number of correct diagnostic samples}}{\text{the number of total samples}}.$$

Segmentation Methods

Figure 3:
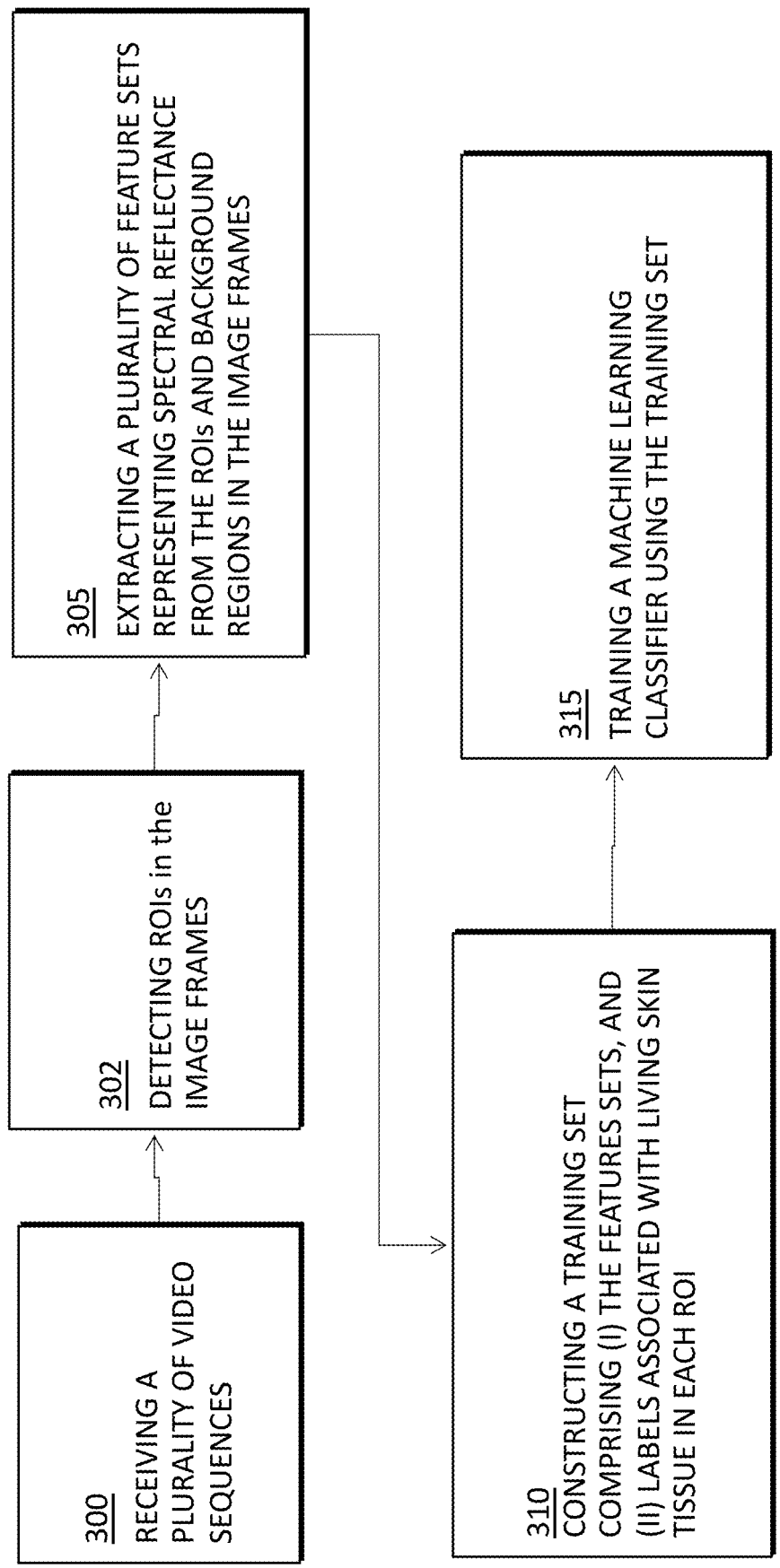
FIG. 3 is a flowchart of functional steps in a process for training a machine learning classifier to detect a living skin tissue in a video sequence, accordance with some embodiments of the present invention.

In some embodiments, the present algorithm may employ one or more segmentation methods for segmenting one or more ROIs detected in image frames comprising a video sequence, as detailed above with reference to FIGS. 2 and 3.

Superpixel Segmentation

In some embodiments, the present method may use ROI segmentation to segment the detected ROIs into a minimum number of segments. In some embodiments, the segment are tracked in the video sequences to accumulate a minimum number of frames (e.g., 125) needed for performing classification on the video sequence.

In some embodiments, segmentation based on super-pixel clustering methods may be employed. For example, a present method may be configured to detect an ROI in sequences of 5 frames, then segment the ROI to a minimum number of segments based on, e.g., a linear iterative clustering (SLIC) algorithm. In some embodiments, the present method may be configured to perform segment matching over a time window, e.g., 5 seconds and/or at least 125 frames (at a frame rate of 25 fps) each. In some embodiments, segment matching may be performed using, e.g., center of mass (COM) adjustment and/or polygon shape adjustments between consecutive frames. Once the ROI is segments for the duration of the time window, a set of features may be extracted.

Figure 4:
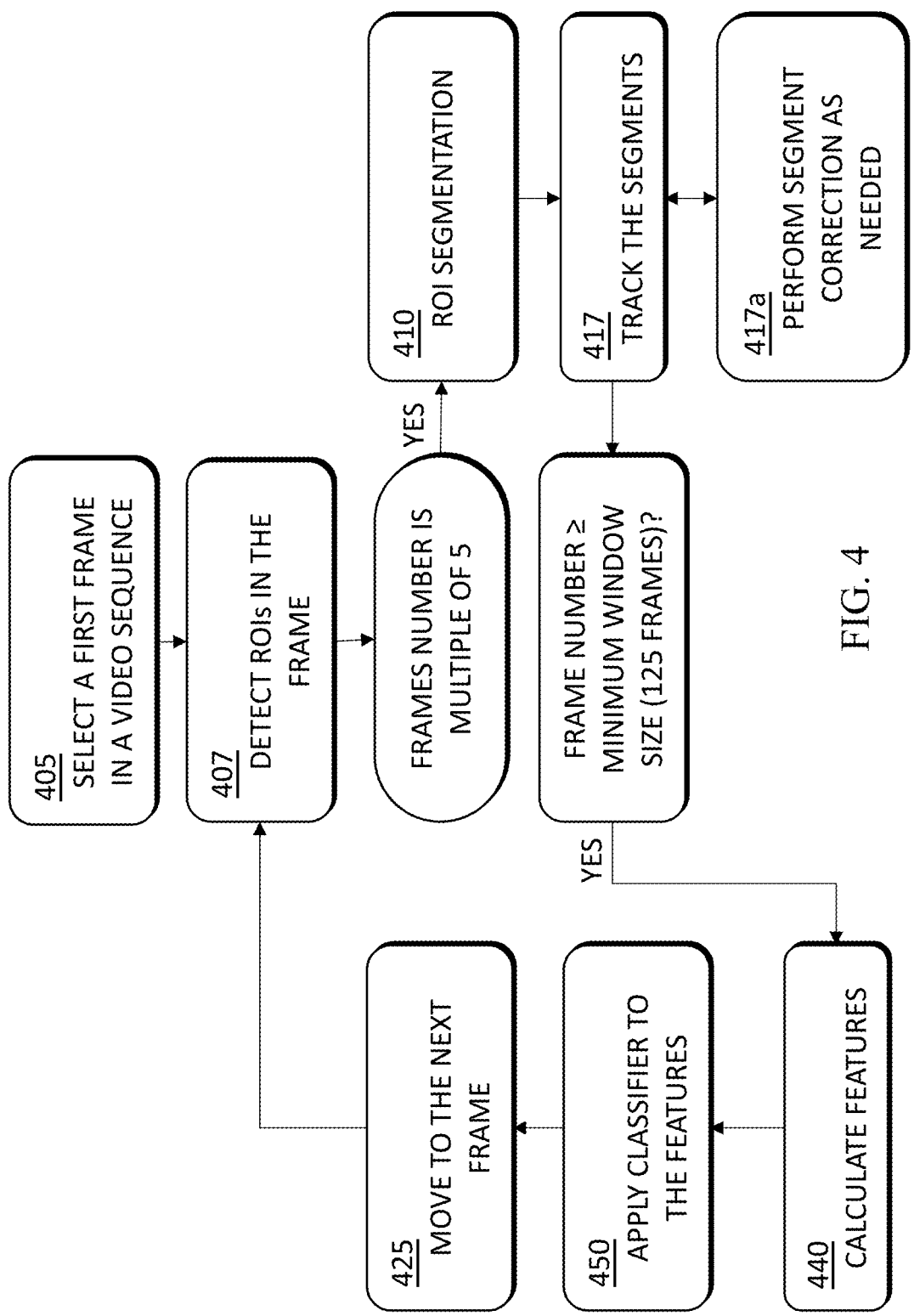
FIG. 4 is a flowchart of the functional steps in process designed to detect living skin tissue in a video sequence, accordance with some embodiments of the present invention.

FIG. 4 is a flowchart of the functional steps in process designed to detect living skin tissue in a video sequence using superpixel segmentation, in accordance with some embodiments of the present invention. At step 405 in FIG. 4, a first frame in a video sequence is selected.

At step 407 one or more ROIs may be detected in the first frame, as detailed above with reference to steps 215 in FIGS. 2 and 302 in FIG. 3. In some embodiments, once the number of frames which undergoes the ROI detection is a whole number (e.g., 5) which is a division of a typical number of frames per second in a video stream (e.g., 25). In some embodiments, if the number of frames does not meet the minimum required, to process may proceed to step 425, to obtain a next frame in the sequence.

At step 410 the detected ROIs undergo a process of partitioning the ROIs to multiple segments. In some embodiments, an algorithm may be applied to segment the detected ROIs by simple linear iterative clustering, e.g., super-pixels.

In some embodiments, the number of segments in an ROI may be determined by a threshold value. In some embodiments, the segment threshold number may be determined by comparing the segment number identified in the current frame, with the number of segments in a previous frame. In such a comparison operation, the higher number of segments determinates the number of segments.

Accordingly, in case no previous frames are identified, e.g., the current ROI in the segmentation process is of the first frame of the segment, the segmentation process may continue to the next frame in the segment.

In some embodiments, the method disclosed herein can be configured to correct the number of segments in case the number of segments does not meet or exceed the threshold value. In some cases, a process of splitting, at least some of the segments in a frame may be conducted be for meeting or exceeding a certain number of segments.

In some embodiments, in case the number of segments meets the threshold, the segment tracking may initiate. In some embodiments, segment tracking can be operated for each segment in the ROI.

In some embodiments, the segmentation process may not produce consistent segmentation results with respect to each frame in a video sequence. Accordingly, at step 417, the segments may be tracked throughout the sequence, to ensure consistency of results. In some embodiments, segment tracking may be based on defining polygons, or clusters of pixels, for each segment, and utilizing these defined polygons for tracking. In some embodiments, the segment tracking can be initiated with tracking the polygons points in a segment. In some embodiments, tracking the polygons involve calculating the values of the color channels of the RGB color space, for each polygon. In some embodiments, tracking the polygons may involve calculating the center of mass in each polygon, in accordance with the values of the red, green and blue channels. In some embodiments, at step 417a, segment correction may be performed, as needed, to enable segment tracking through the series of frames.

In some embodiments, segment tracking and validation is based, at least in part, on matching both (i) a center of mass, and (ii) polygon shape of a segment between two consecutive frames. If a segment is found to be missing in a subsequent frame, it may be added form a previous frame.

In some embodiments, once the segmentation process has detected and tracked one or more segments for required minimum time window (e.g., at least a 5 seconds in duration and/or at least 125 frames at a frame rate of 25 fps), a spectral reflectance signal may be obtained, on which reflectance features may be calculated. Accordingly, at step 440 feature calculating may take place for each segment of segments, as detailed above with reference to steps 220, 230 in FIGS. 2 and 305 in FIG. 3. In some embodiments, an image data processing step may be performed, e.g., by employing image processing as defined in step 225, to derive noise-free image data with respect to at least some of the segments in the ROI.

At step 450, a machine learning classifier may be applied to the features calculated in step 440 to determine whether the tracked segments depict a living skin tissue (inference stage). In some embodiments, a time window of at least 5 seconds and/or at least 125 frames (at a frame rate of 25 fps) each is needed to obtain a result. In some embodiments, the present process may employ an overlap between consecutive time windows, e.g., of 1 frame.

In some embodiments, a trained machine learning algorithm may be applied to the execrated features. in some embodiments, a prediction of the machine learning algorithm may be based on an entire sequence. In some embodiments, the prediction classification may be determined as, e.g., an average or median prediction of a specified time window, e.g., 2 seconds. In some embodiments, this method allows for error reduction in the classification process.

Permanent Segmentation

In some embodiments, uniform and permanent segmentation techniques may be used to splitting each frame in a video sequence into rectangles, e.g., by applying a fixed grid of rectangles to an ROI detected in the image frames.

Figure 5:
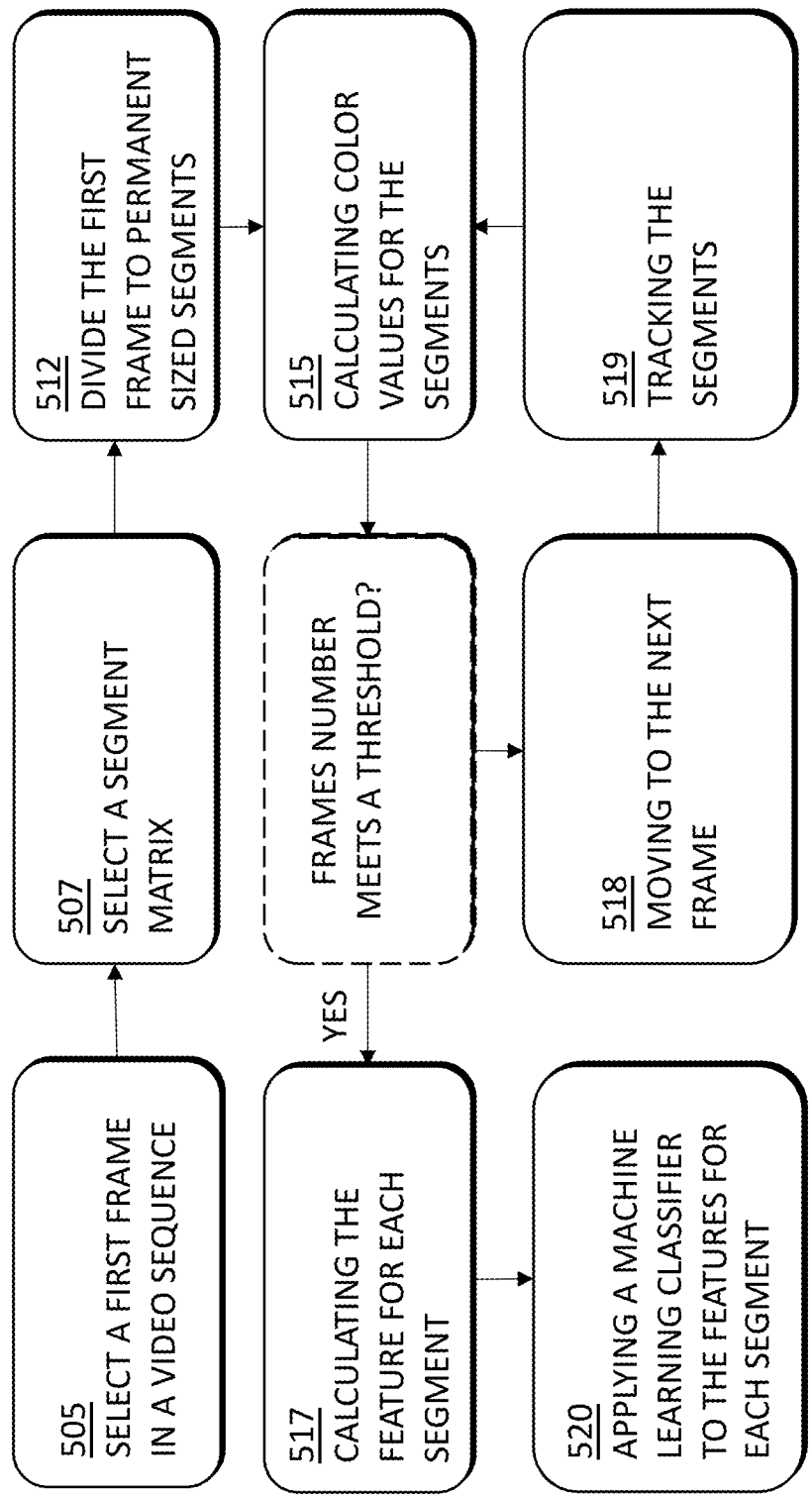
FIG. 5 is a flowchart of the functional steps in process to detect living skin tissue in a video sequence, based on uniform and permanent sized segments, accordance with some embodiments of the present invention.

FIG. 5 is a flowchart of functional steps in process designed to detect living skin tissue in a video sequence, based on uniform and permanent sized segments, accordance with some embodiments of the present invention. At step 505 a first frame in a video sequence is selected. Such a video sequence can be a segment defined by a time window in a video stream depicting an object, e.g., a human, a human face, a skin region in a human, etc. In some embodiments the frame per second value of the video stream, denoted herein as FPS, may be detected at step 505.

In some embodiments, the segmentation process can be based on a labeled matrix utilized to segment a frame. In such a case, each label can identify a specific segment in the frame. In some embodiments, the matrix may comprise squares of identical sizes, e.g., a grid. In some embodiments, the matrix may be utilized to directly segment the frames without detecting ROI's in the frames. At step 507 a matrix of segments can be selected. In some embodiments, such a matrix can be comprised of constant size areas, e.g., rectangles utilized to segment the frames. In some embodiments, grid size may be, e.g., 50×50 pixels, or a range of between 20-70×20-70 pixels.

At step 512 the first frame in the segment is divided to segments according to the segment matrix. In some embodiments, the segmentation process may be based on segments with uniform and permanent sized segments in the first frame. In some embodiments, a preprocessing stage may comprise using a least mean squares (LMS) filter to preprocess the extracted features.

At step 515 the values of the RGB channels may be calculated for the segments. In some embodiments, the calculation may be of the average values of the RGB channels in each segment. For example, the (Eq. 2) can be used for calculating such values. In some embodiments, an image data processing step may be performed, e.g., by employing image processing as defined in step 225, to derive relevant image data with respect to at least some of the segments in the ROI.

In some embodiments, in case the number of segmented frames meets, or exceeds a threshold value, the feature calculating step 517 can initiate. Alternatively, if the number of frames doesn't meet the threshold value, the action of moving to the next frame can occur (Step 518). In some embodiments, the threshold value can be at least 5 second and/or at least 125 frames (at a frame rate of 25 fps) each. In some embodiments, consecutive sequences may overlap with one another, e.g., by 1 frame.

At step 519 a segment tracking process can be initiated at the next frame. In some embodiments, first, the next frame is segmented by being divided to segments, according to the matrix, as depicted in step 507.

In some embodiments, the process of segmenting the frames as elaborated in steps 515-519 may continue till the number of segmented frames meets or exceeds a threshold value. In some embodiments, the threshold value may be the number of frames in a video sequence, defined by a time window. In some embodiments, the segment tracking process is a continuous process with respect to each time window.

At step 517 the feature calculation step may take place for each of the segments, in each of the frames. In some embodiments, the features calculation can be according to the features listed as part of the feature calculation process disclosed at step 230. In some embodiments, prior the feature calculation, an image data processing step may be performed, e.g., by employing image processing as defined in step 225, to derive noise-free image data with respect to at least some of the segments in the ROI. In some embodiments, diverse segmenting types can be used, as elaborated further below.

At step 520 a machine learning classifier may be applied to the features calculated in step 517. Accordingly, in some embodiments, wherein the number of frames is below a threshold value, determining whether the tracked segments depict living skin tissue may be based on the result of the machine learning classifier. In some embodiments, the threshold value may be calculated as 5*FPS+1*FPS, e.g., 150. in some embodiments, other threshold values may be employed. In some embodiments, a prediction validation process may be implemented with respect to a portion of a sequence, e.g., the final 1 second segment of the sequence.

Blobs Skin Tracker

In some embodiments, a blob skin tracking method may be employed. In some embodiments, blob detection is based on skin color and the tracking algorithm is KLM. In some embodiments, tracking may be performed in two stages:

(i) Tracking blobs for at least 5 seconds to collect the raw data and calculate the features for classifier, and ML prediction.

(ii) Continuous tracking of the blobs classified as representing living skin tissue.

In some embodiments, blob tracking may account for, e.g., intersection between blobs, negative boundary box for a blob, and/or blobs without "skin pixels."

Object Tracking

In some embodiments, the present disclosure may combine object detection, polygon tracking, and machine learning classification for tracking objects in a video stream and classifying segments of the objects as to whether they depict living skin tissue.

In some embodiments, this combination of processes may be configured to reduce computational overhead and facilitate real-time tracking.

In some embodiments, object detection may be based on detecting potential skin color in the various color models (e.g., RGB, HSV and YCbCr). This result of this process may comprise objects polygons that are potentially living skin tissue segments. The prediction model may then be employed to detect whether each polygon depicts living skin tissue. Then, each predicted skin segment will be tracked in the video stream. In some embodiments, in each time window of the video stream, the object detection method may determine whether any new object is present in the sequence. In case that an object disappears from a frame, the object detection method may be re-employed to detect current objects in the sequence.

Figure 6:
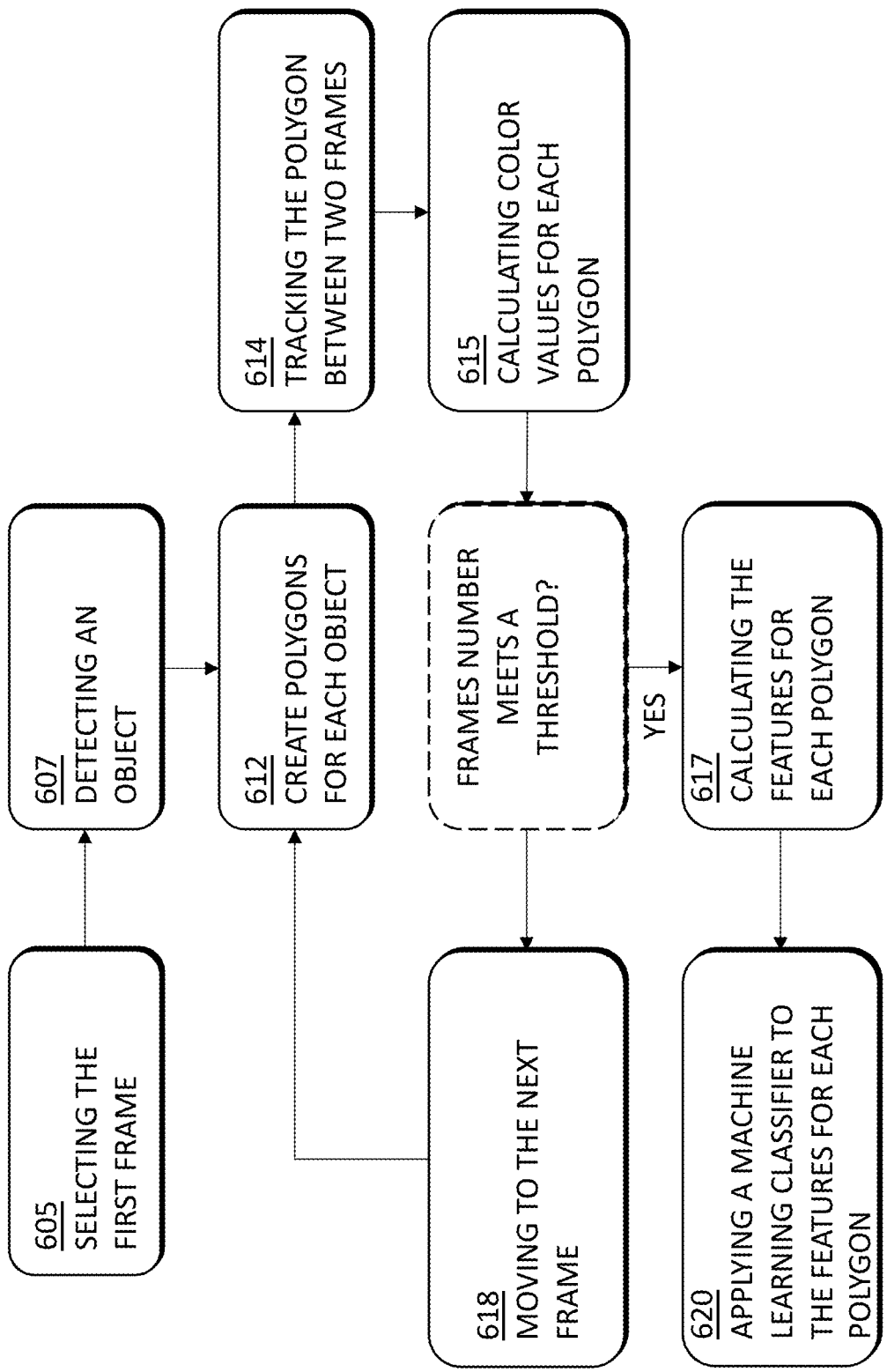
FIG. 6 is a flowchart of the functional steps in process to detect living skin tissue in a video sequence, based on tracking polygons, in accordance with some embodiments of the present invention.

FIG. 6 is a flowchart of functional steps in process to detect living skin tissue in a video sequence, based on tracking polygons, accordance with some embodiments of the present invention.

At step 605 a first frame in a video sequence is selected. Such a video sequence can be a segment defined in a time window from a video stream depicting an object of a human body. In some embodiments the frame per second value of the video stream, denoted herein as FPS, may be detected at step 605.

At step 607 an object detection process may apply to the first frame, for detecting objects comprising human bodily regions. In some embodiments, a combination of several algorithms may be utilized. In some embodiments, detecting the object may be initiated by using algorithms and/or methods which are based on potential skin color calculated according to the color formats of RGB, HSV and YCbCr color space.

At step 612 a polygon can be created for each object detected in the first frame, at step 607. Step 614 defines the object tracking. Such an object tracking can be performed in the first, or in any other frame in the subsequent. In some embodiments, the object tracking can be performed by tracking specific shapes, e.g., polygons, within the objects. In some embodiments, the position of the polygons may be adjusted for every object detected in the respective frame. In some embodiments, the object tracking may be performed as elaborated at step 417.

At step 615 the values of the RGB channels may be calculated for the segments. In some embodiments, the calculation may be of the average values of the RGB channels in each segment. For example, the (Eq. 2) can be used for calculating such values. In some embodiments, an image data processing step may be performed, e.g., by employing image processing as defined in step 225, to derive relevant image data with respect to at least some of the segments in the ROI.

In some embodiments, in case the number of frames with tracked objects meets, or exceeds a threshold value, the feature calculation can initiate. Alternatively, in case the number of frames doesn't meet, or exceed a threshold value moving to the next frame can occur (Step 618). In some embodiments, such a threshold value can be 125 frames.

At step 617 the feature calculation step may take place for each of the polygons. In some embodiments, the features calculation can be according to the features listed as part of the feature calculation process disclosed at step 230.

At step 620 a machine learning classifier can apply to the features calculated for each of the polygons in step 617, to determine whether the tracked objects depict a living skin tissue. In some embodiments, in case the score of the machine learning classifier indicates that the tracked object depicts a living skin tissue, the object may be continuously tracked for each time window. In such case, the object detecting algorithm may be operated to detect objects. In some cases, wherein an object cannot be detected in a frame of a video sequence, the object detecting algorithm may be operated to detect objects again. In such a case, the machine learning algorithm may apply to classify the object.

Experimental Results

Figure 7A:
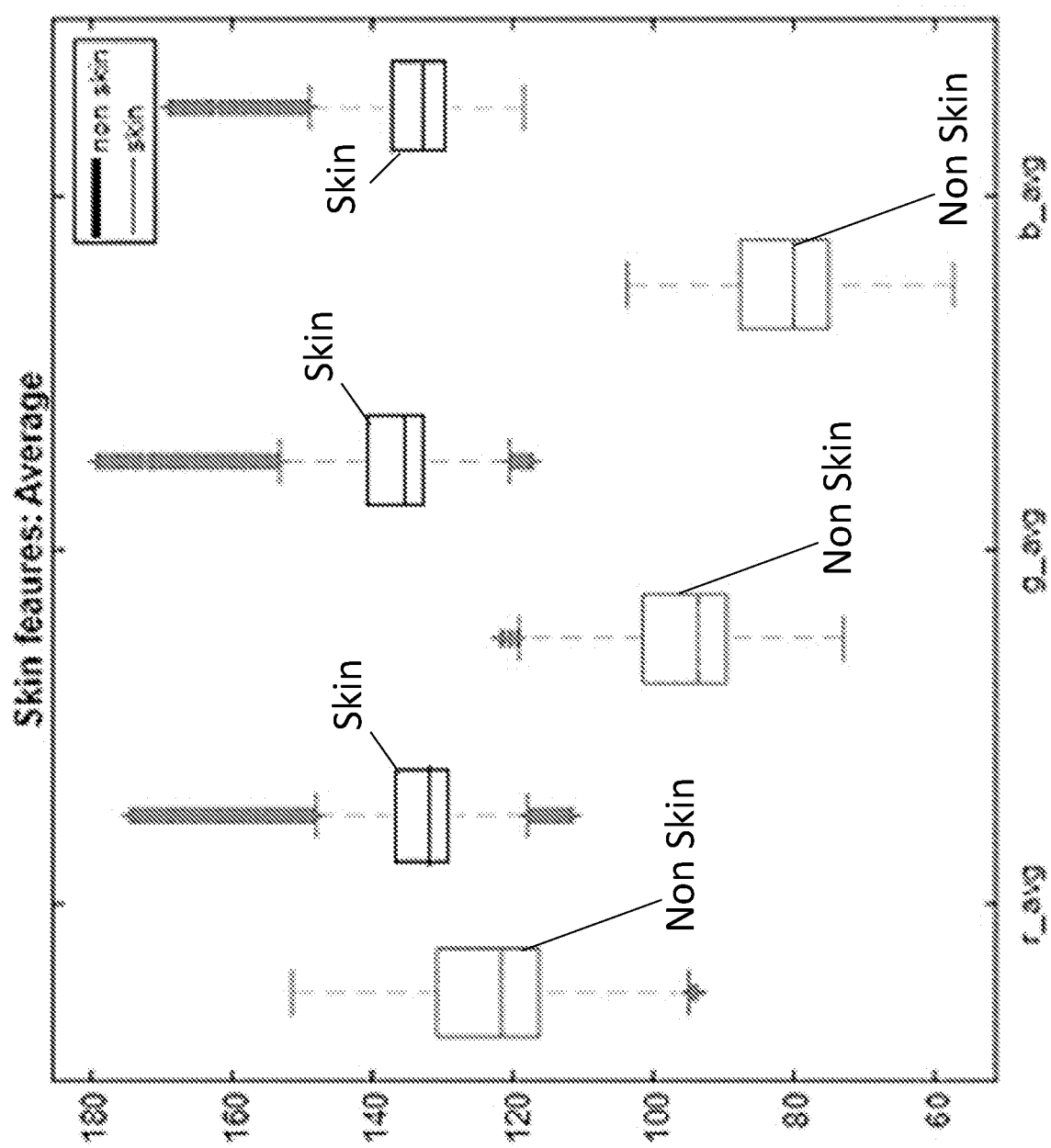
FIGS. 7A-9B are results of a statistical analysis of two groups, skin and non-skin, in accordance with some embodiments of the present invention.
Figure 7B:
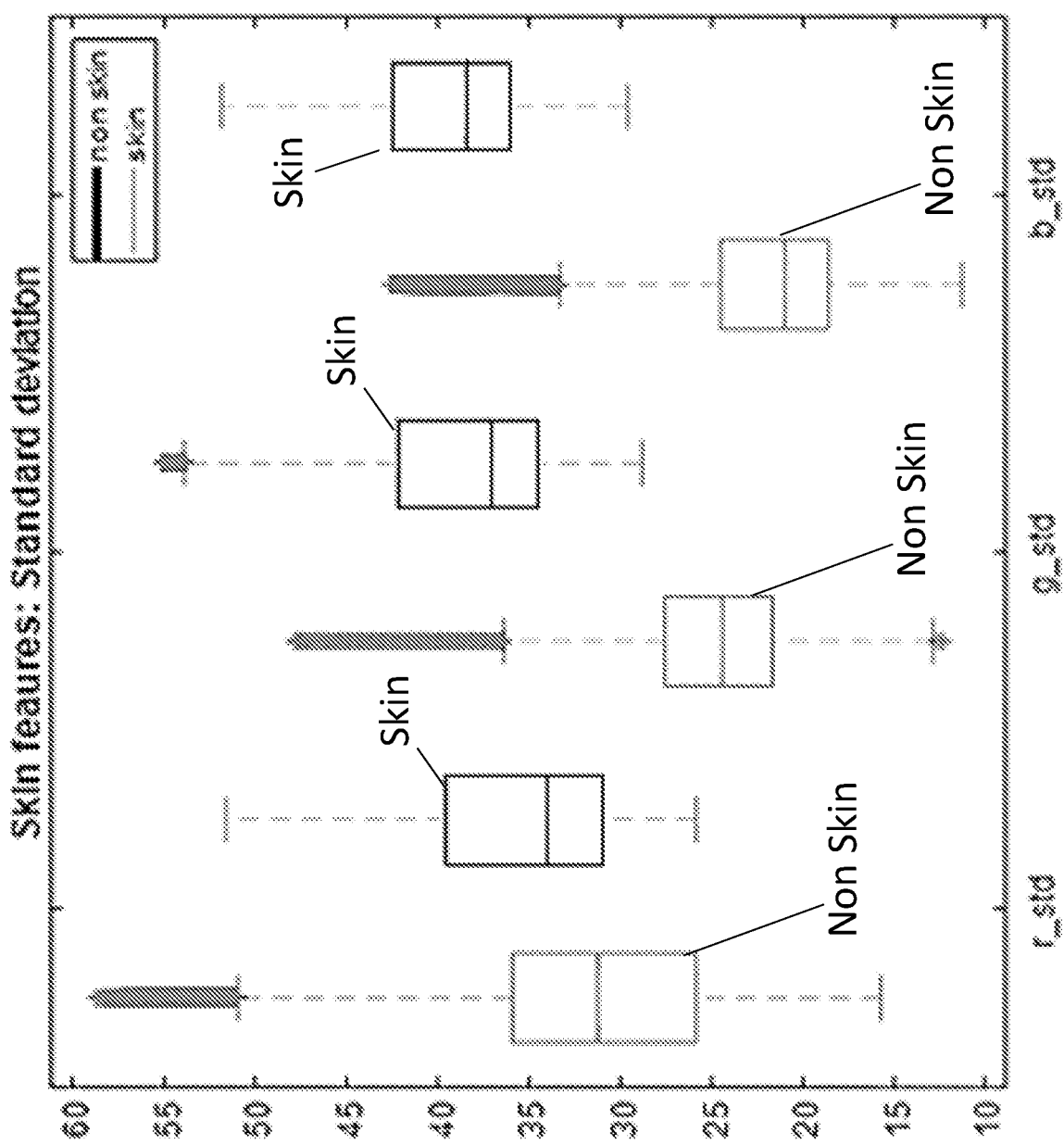
Figure 7C:
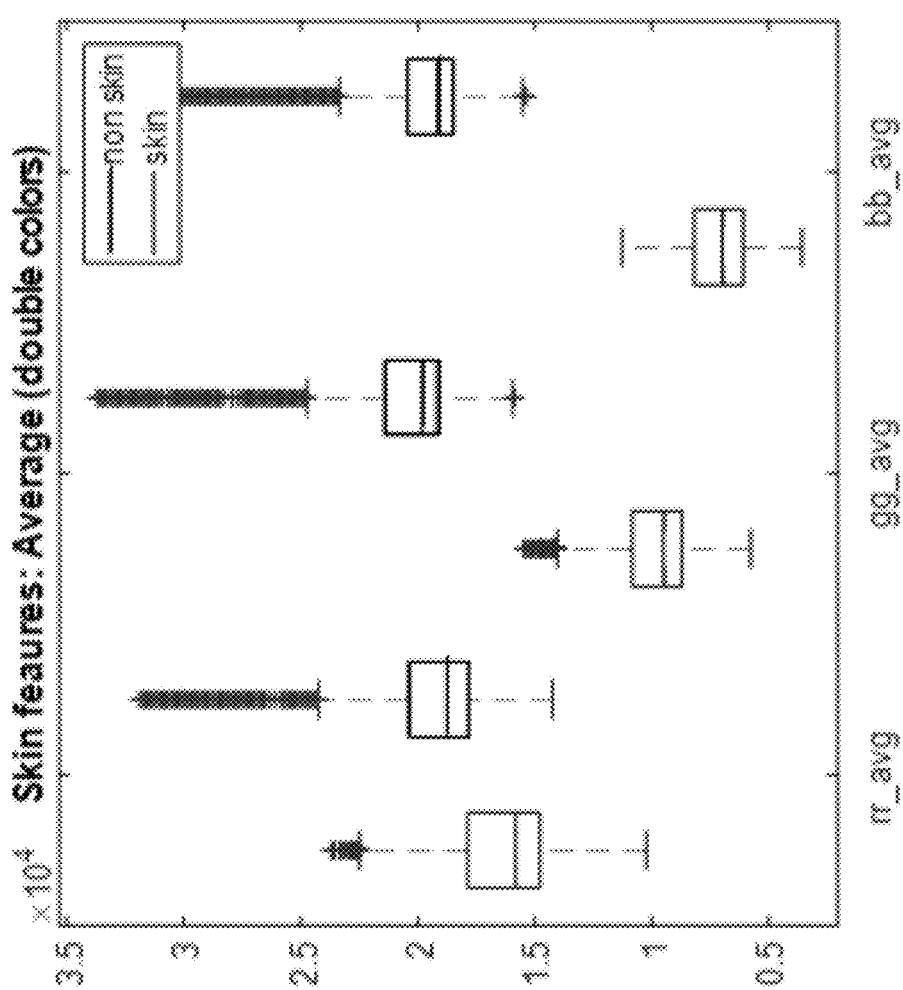

FIG. 7A-7C are results of a machine learning algorithm applying to the extracted features, wherein the image data processing is calculated independently for each color channel, in accordance with some embodiments of the present invention. FIG. 7A shows a comparison between non-skin segments and skin segments, wherein the color channel average values are used. FIG. 7B shows a comparison between non-skin segments and skin segments, wherein the standard deviations of the color channels are used, and FIG. 7C shows a comparison between segments depicting skin and segments depicting non-skin, wherein the double color channels are used.

In some embodiments, the image data processing calculated independently for each color channel, e.g., in step 225, may use the Eqs. 1.1, 1.2, 1.3.

Figures 8A, 8B:
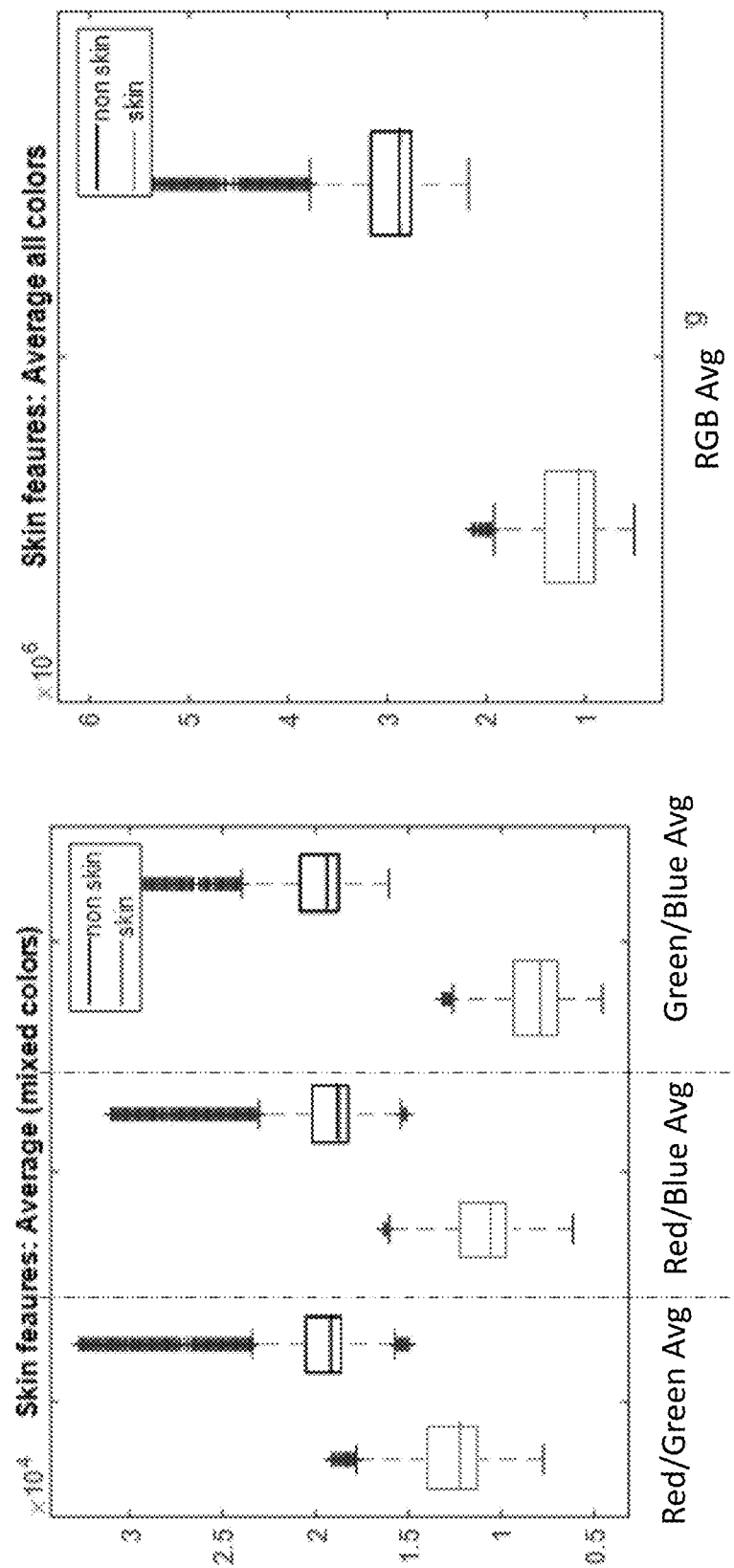
Figure 8C:
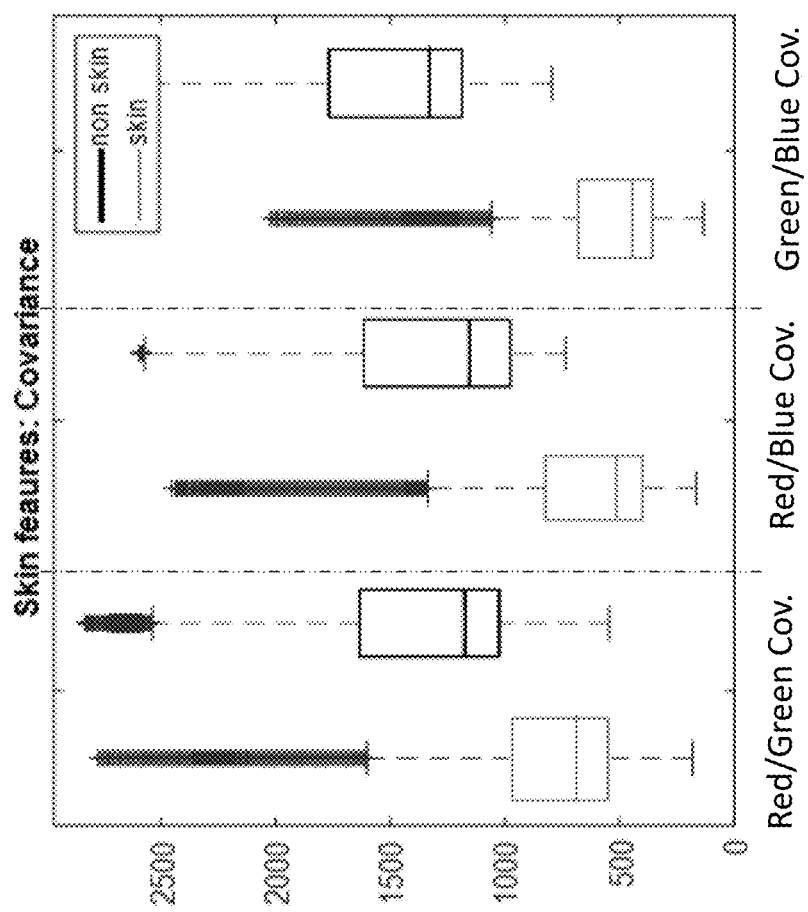

FIG. 8A-8C are results of a machine learning algorithm applying to the extracted features, wherein the image data processing is calculated for the average of all color channels, in accordance with some embodiments of the present invention. FIG. 8A shows the average differences of a comparison of the red*green, red*blue, green*blue color channel combinations. FIG. 8B shows the average differences among all color channels red*green*blue, and FIG. 8C shows the covariance differences compared between the red and green color channels, between the red and blue color channels, and between the green and blue color channels.

In some embodiments, the image data processing is calculated for the average of all color channels, e.g., in step 225, may use the Eq. 2 above.

In some embodiments, wherein a machine learning classifier is trained with features extracted from segmented videos steams, and the prediction results are examined from at least 3 videos streams with different uniform background the total classification result can be 50% accuracy, wherein all the test sets are classified as non-skin.

Figure 9A:
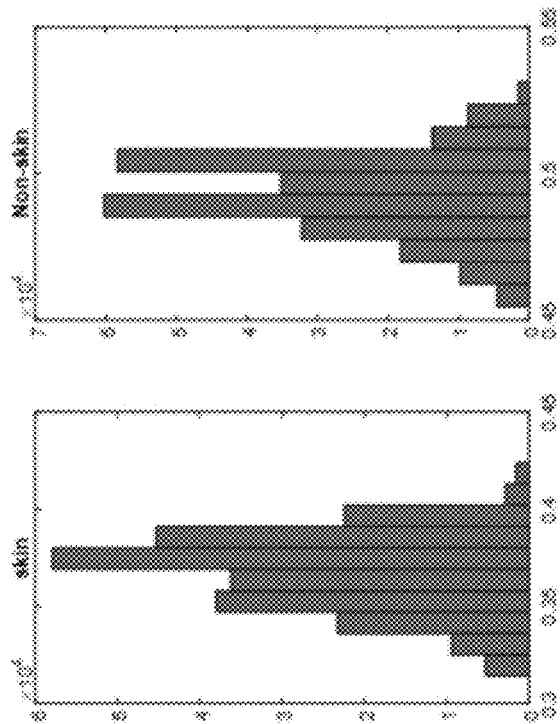
Figure 9B:
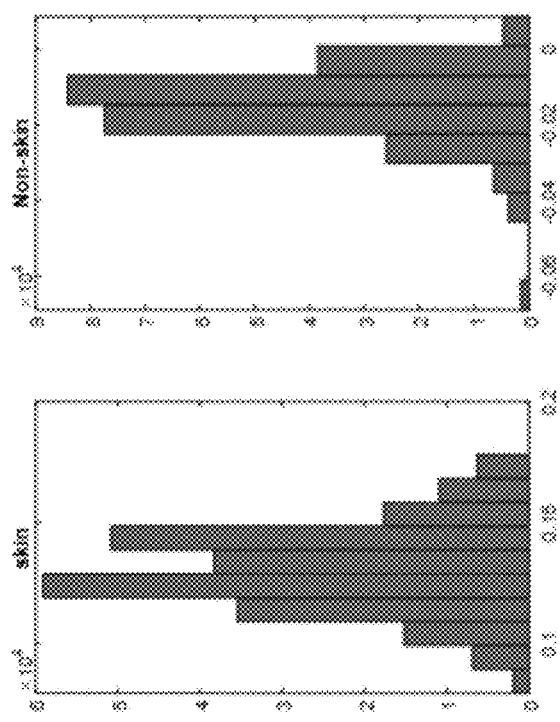

FIGS. 9A-9B show experimental results of models trained based on features representing ratios between RGB channels. In some embodiments, there is an absolute separation of the ratio features between the skin and the non-skin segments. The performance results can be seen in table 2 below.

TABLE 2

Model performance results

| ML Algorithm | Features | Results |
|---|---|---|
| Random Forest | 17 + Ratio | 69% (100%) |
| KNN | | 66% (100%) |
| Random Forest | Ratio | 99.4% (100%) |
| KNN | | 99.2% (100%) |
| SVM | | 99.1% (100%) |

In some embodiments, the results include the validation group (wherein the accuracy in the brackets levels are in brackets in table 2) and the test group accuracy. The validation group can include videos streams from the original data set derided from the training set. Table 2 shows the classification of the ratio of the features.

Figure 10A:
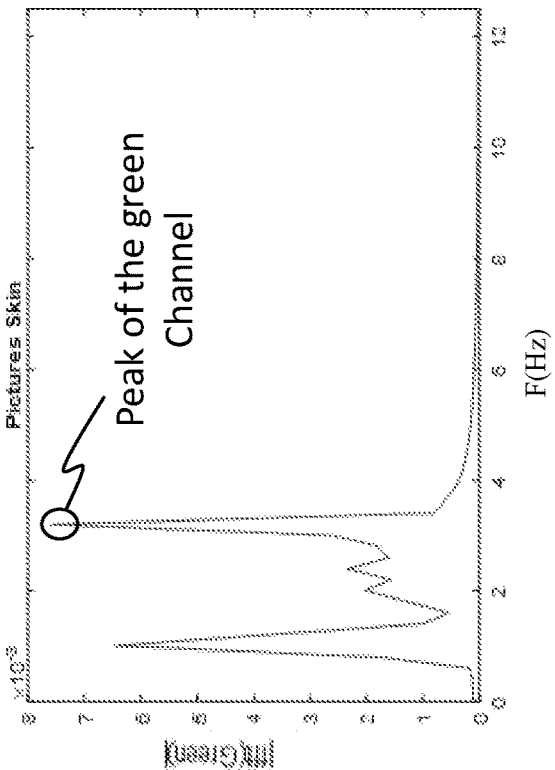
FIGS. 10A-10C show the green band in the spectral reflectance intensity, as received from a skin object, in accordance with some embodiments of the present invention.
Figure 10B:
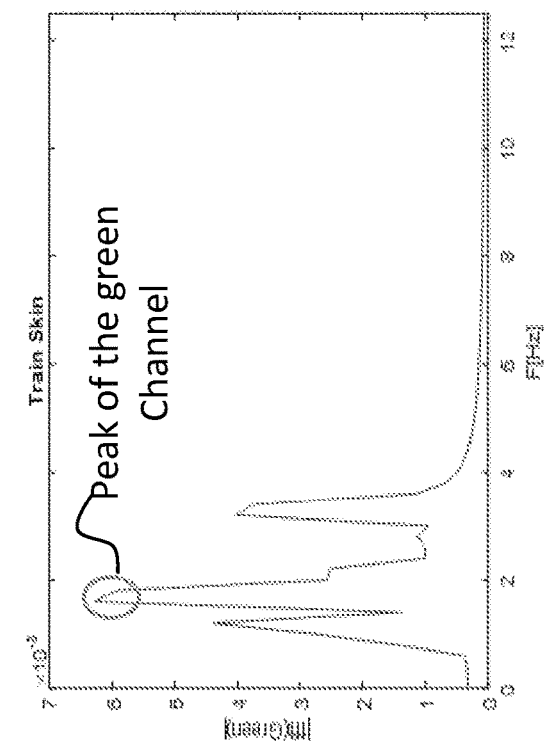
Figure 10C:
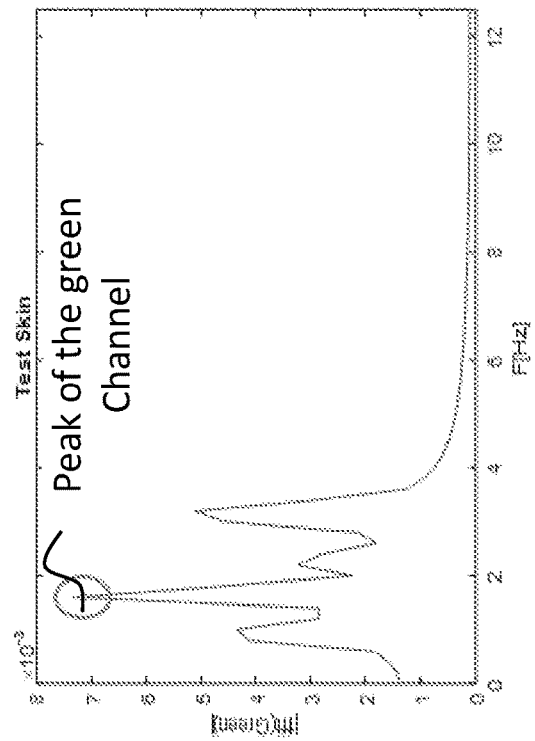

FIGS. 10A-10C show the green band in the spectral reflectance intensity, as received from a skin object, in accordance with some embodiments of the present invention. In some embodiments, a clear peak around 1.5 Hz is received, which is in some cases, can be correlated to heart rate pulse. In some cases, the green channel can be cleaned with Eqs. 2-4.

Figure 11A:
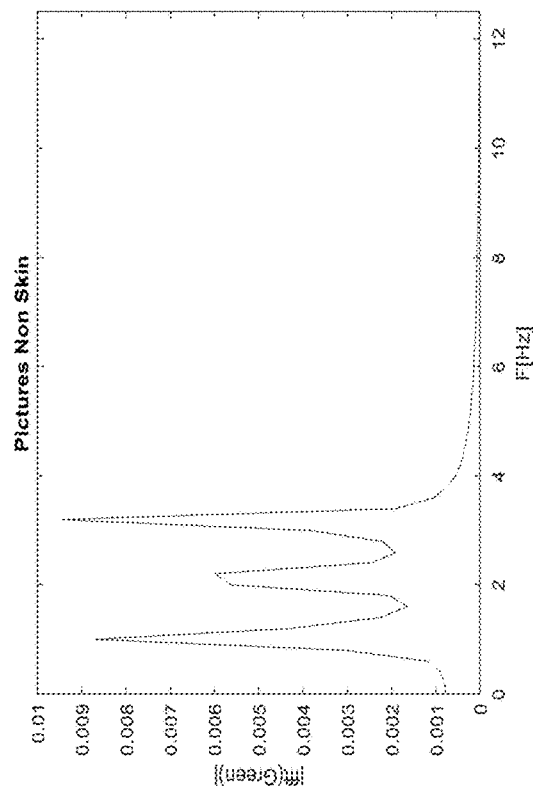
FIGS. 11A-11C show the green band in the spectral reflectance intensity, as received from a non-skin object, in accordance with some embodiments of the present invention.
Figure 11B:
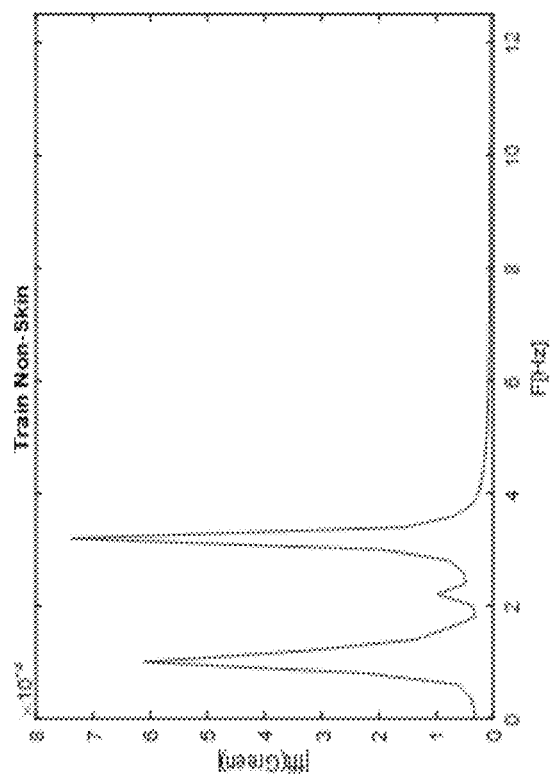
Figure 11C:
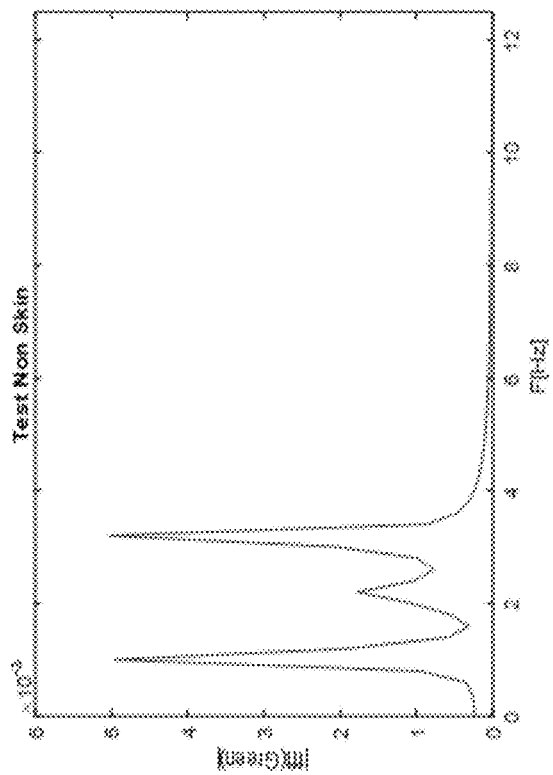

FIGS. 11A-11C show the green band in the spectral reflectance intensity, as received from a non-skin object, in accordance with some embodiments of the present invention. In some embodiments, a different area under the curve between skin and non-skin segments can be measured. This difference may appear in additional color channels (e.g., red and/or blue). In some cases, summing the area under the curve of the three channels can provide a feature which increases the accuracy of the machine learning algorithm.

Figure 12A:
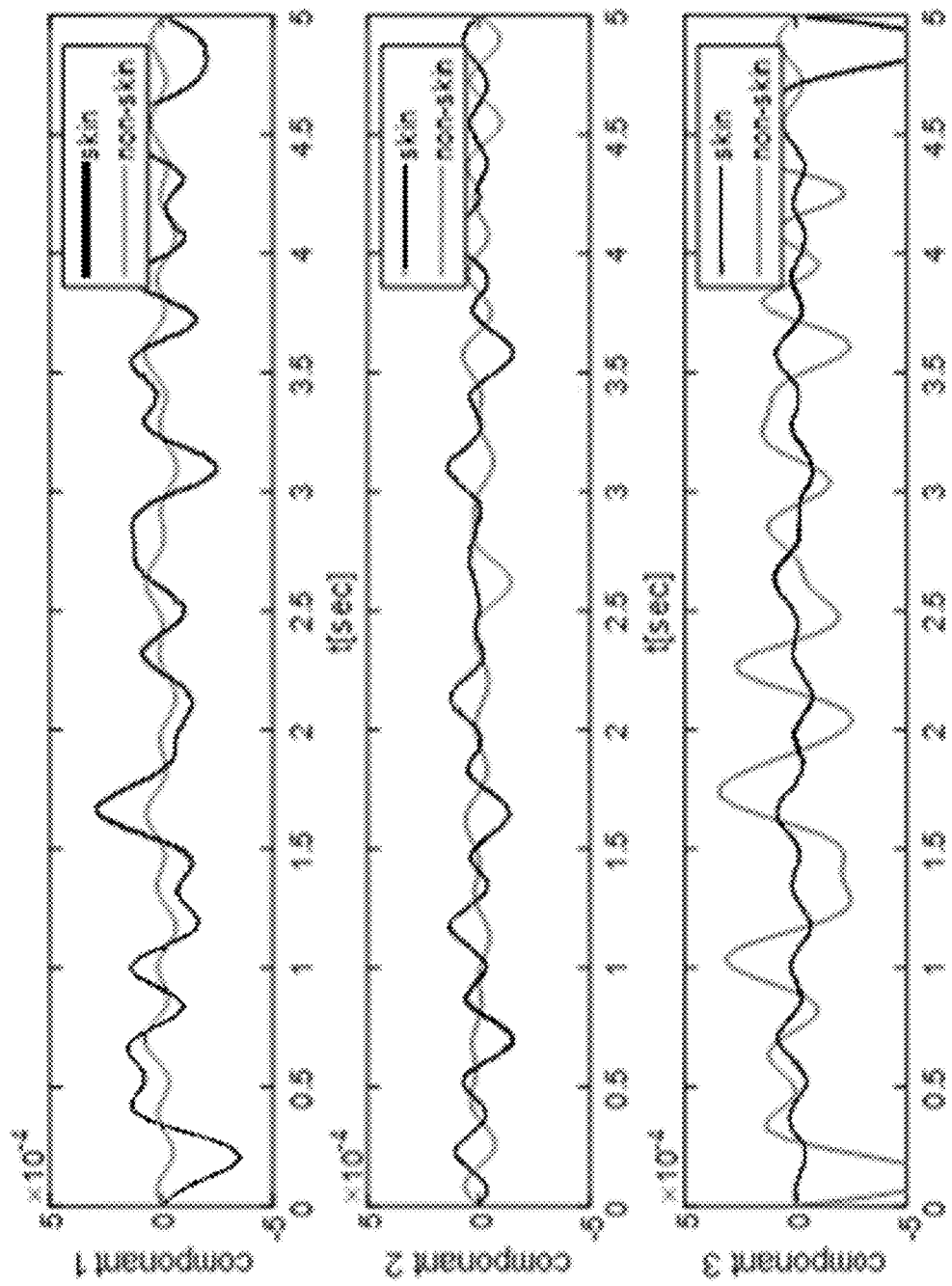
FIGS. 12A-12C show the Linear Independent Component Analysis (ICA) of the RGB channels, in accordance with some embodiments of the present invention.
Figure 12B:
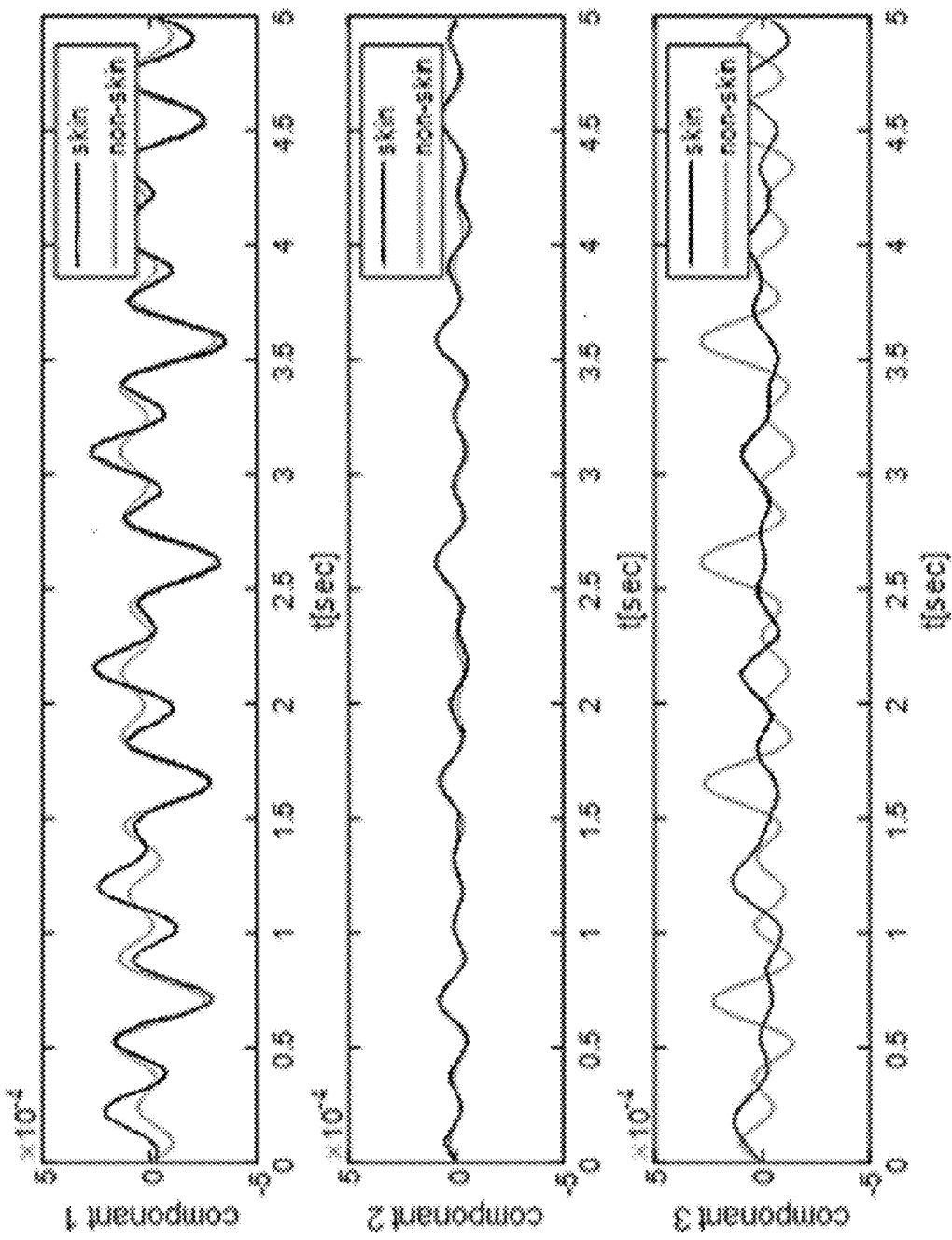
Figure 12C:
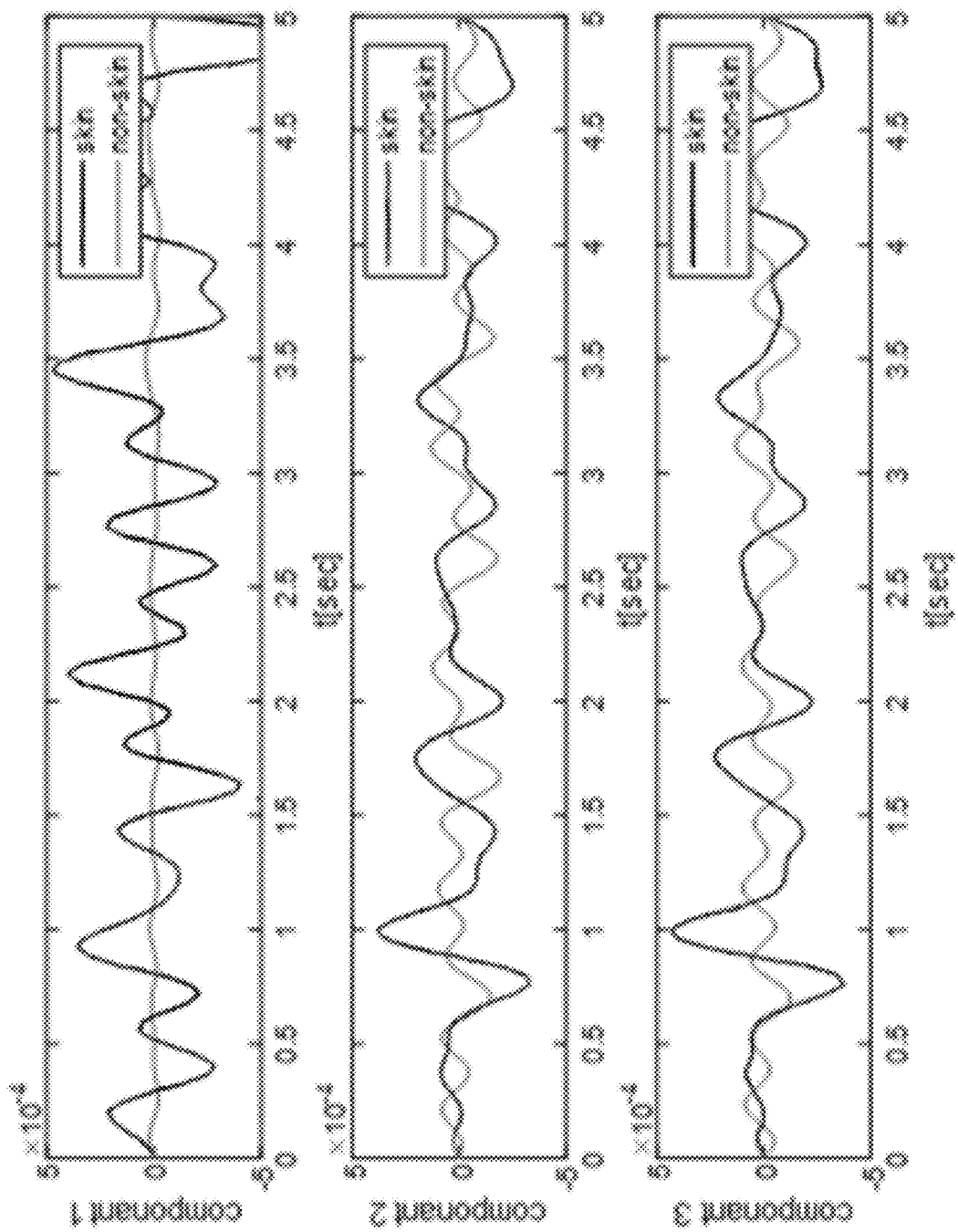

FIGS. 12A-12C show the Linear Independent Component Analysis (ICA) of the RGB channels, in accordance with some embodiments of the present invention. In some embodiments, the curves of the color channels may be modified by an input considered as noise. In some embodiments, this noise can be reduced, minimized, or removed from the color channels, by utilizing the ICA.

Accordingly, FIGS. 12A-12C show the curves of the intensity values calculated in a non-skin objects as smaller than the curve of the intensity values calculated for skin objects. Those differences in the curves, can lead to some differences in the area under the curves. For example, FIG. 12A shows a training group wherein the third component on the ICA manifests a difference between the curves. FIG. 12B shows a picture group wherein the third component on the ICA manifests a difference between the curves.

FIG. 12C shows a test group wherein the first component on the ICA manifests a significant difference between the curves. Hence, in some embodiments, calculating/extracting these features for the three components and sum the result values, or select the maximum value between the results may be the utilized method. In some embodiments, sum the result values can be by using the Eqs. 13-16.

Figure 13B:
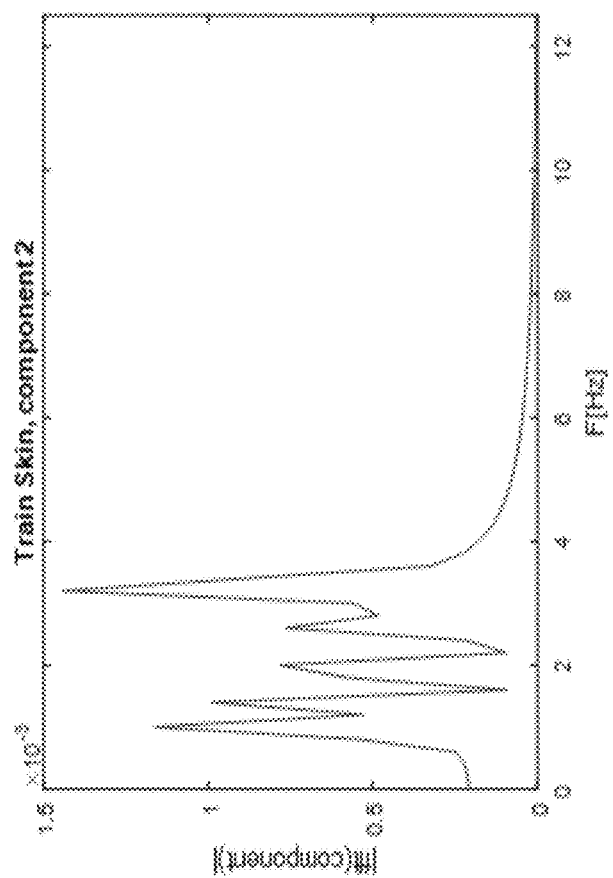
FIGS. 13A-13C show the intensity frequency values of a living skin tissue training set, calculated independently for each ICA component, in accordance with some embodiments of the present invention.
Figure 13A:
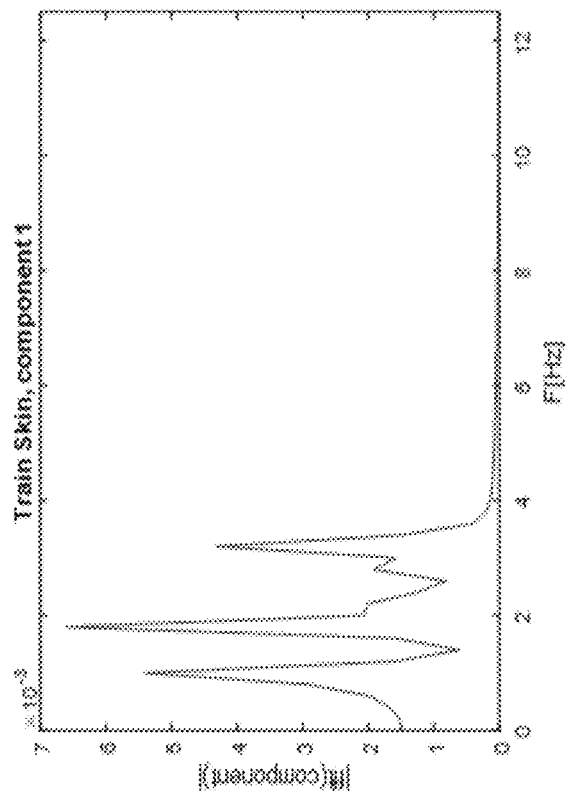
Figure 13C:
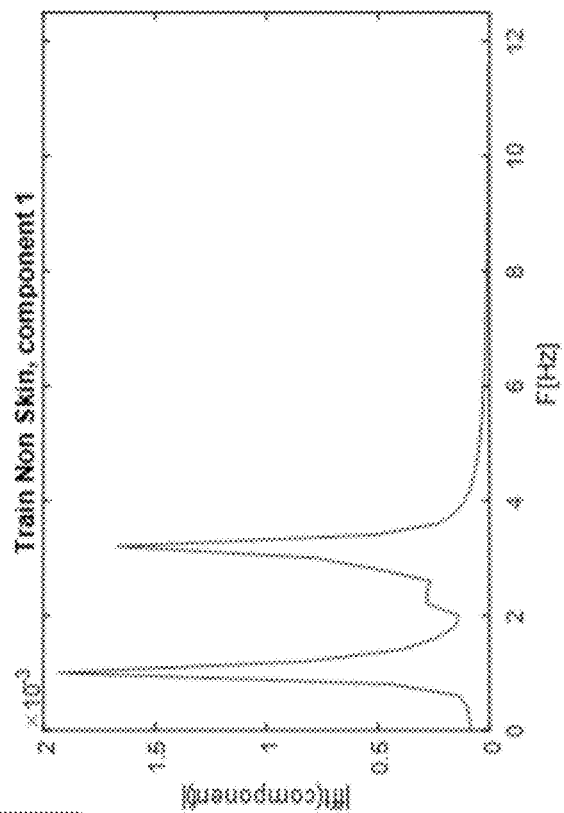
Figure 13D:
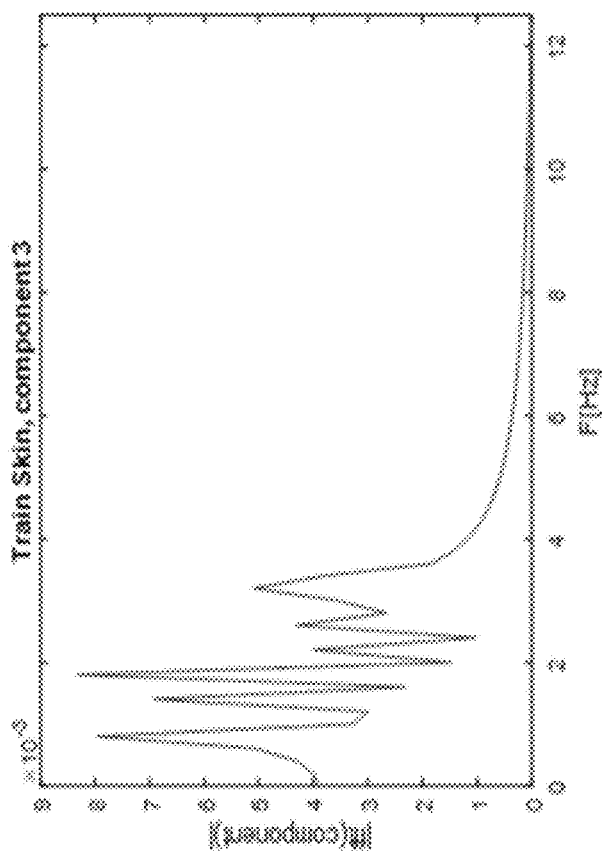
FIGS. 13D-13F show the intensity frequency values of a non-skin training set, calculated independently for each ICA component, in accordance with some embodiments of the present invention.
Figure 13F:
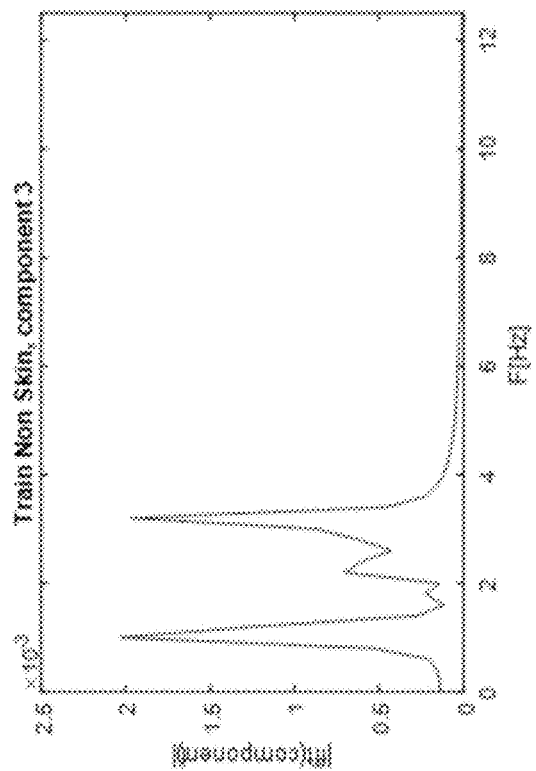
Figure 13E:
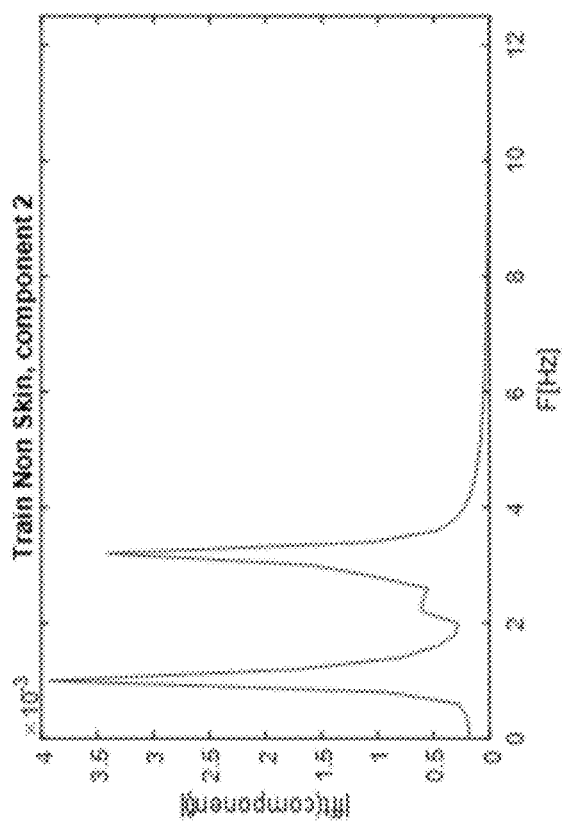

FIGS. 13A-13C show the intensity frequency values of a living skin tissue training set, calculated independently for each ICA component and FIGS. 13D-13F show the intensity frequency values of a non-skin training set, calculated independently for each ICA component, in accordance with some embodiments of the present invention.

Figure 14A:
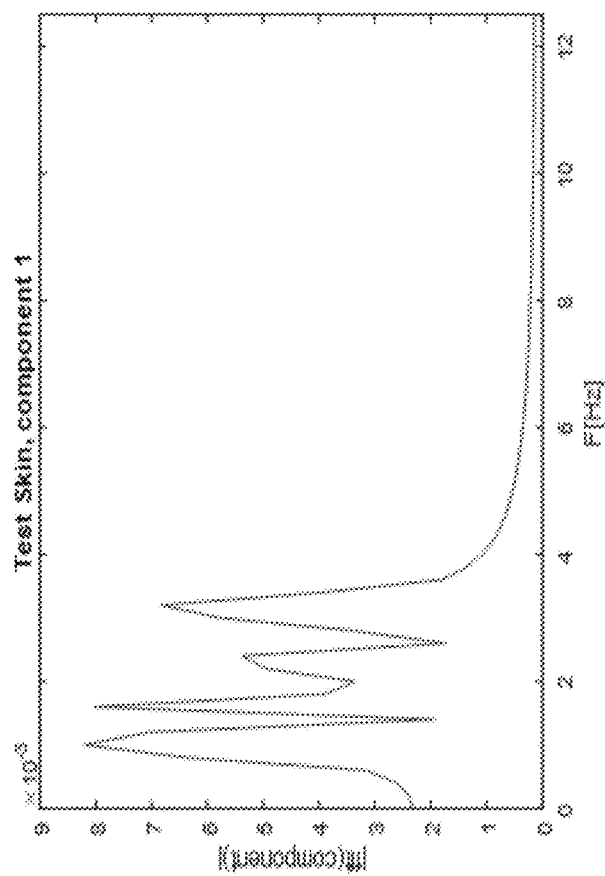
FIGS. 14A-14C show the intensity frequency values of a living skin tissue test set, calculated independently for each ICA component, in accordance with some embodiments of the present invention.
Figure 14B:
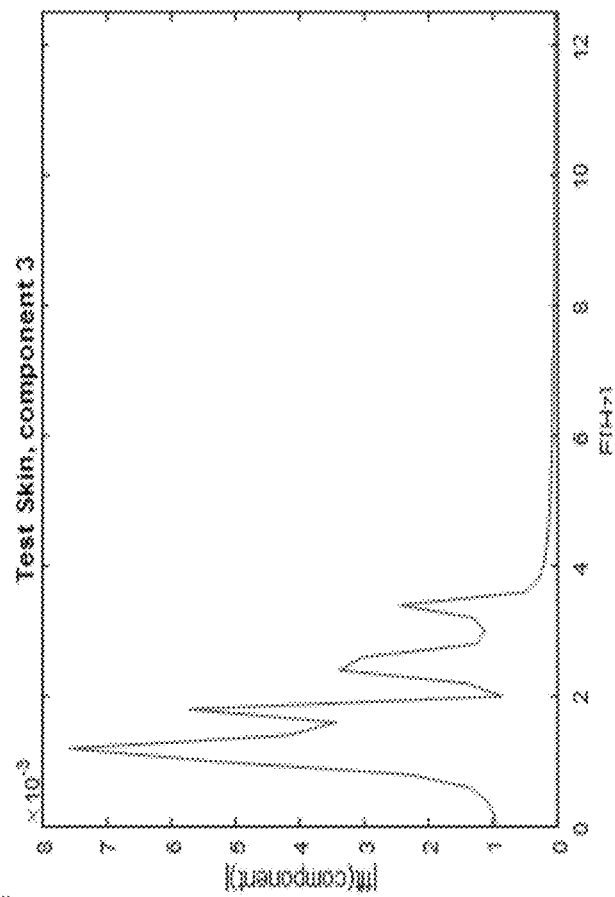
Figure 14C:
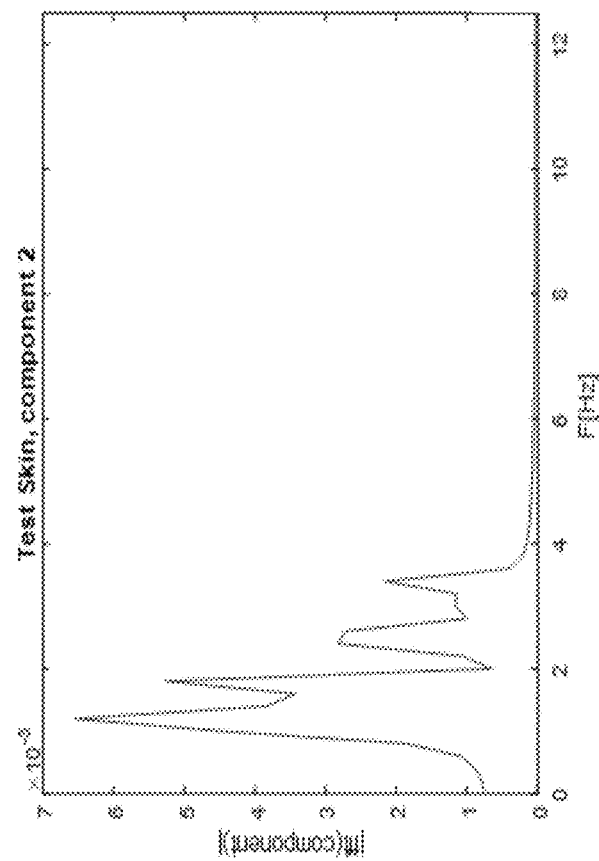
Figure 14E:
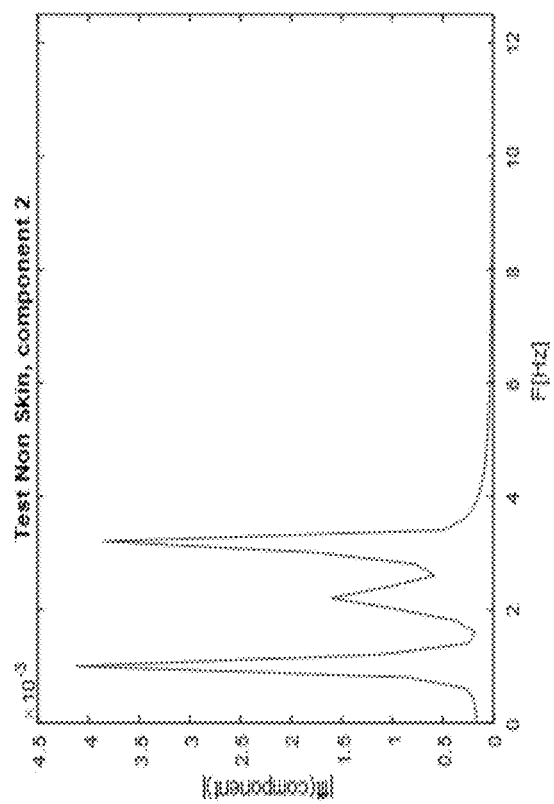
FIGS. 14D-14F show the intensity frequency values of a non-skin in test set, calculated independently for each ICA component, in accordance with some embodiments of the present invention.
Figure 14D:
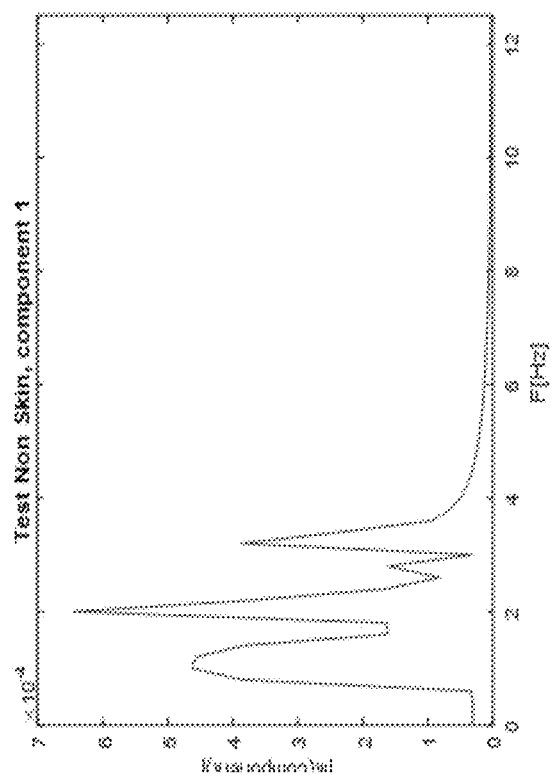
Figure 14F:
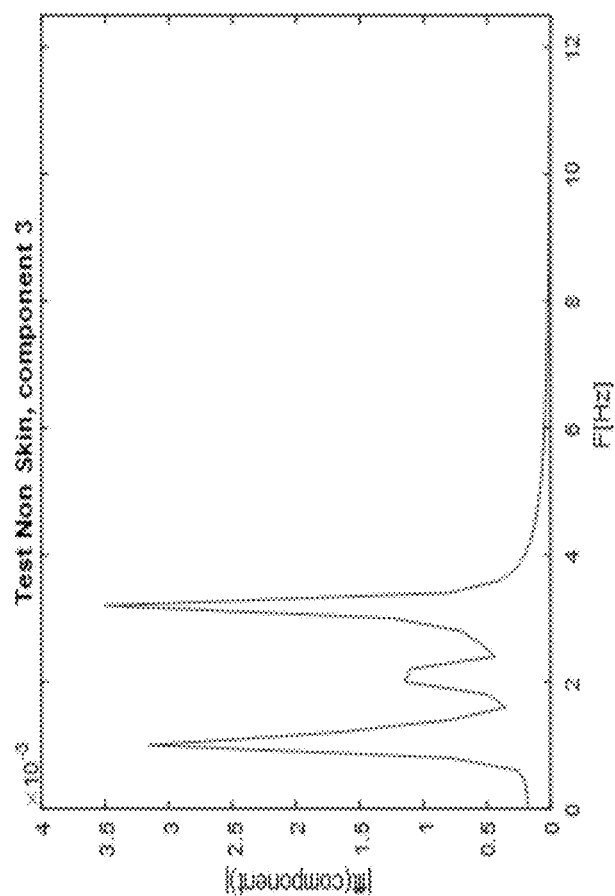

FIGS. 14A-14C show the intensity frequency values of a living skin tissue test set, calculated independently for each ICA component, and FIG. 14D-14F show the intensity frequency values of a non-skin in test set, calculated independently for each ICA component, in accordance with some embodiments of the present invention.

As shown in the above FIG. 13A-13F, for the training set, and FIG. 14A-14F, for the test set depict the different in the spectrum resulting from the reflectance received skin and non-skin cases. The figures above show a peak in between 1 Hz and 3 Hz for skin, wherein the spectral bands underwent an ICA. In some embodiments, the values of the ICA components may be calculated by the Eq. 17.

Figure 15:
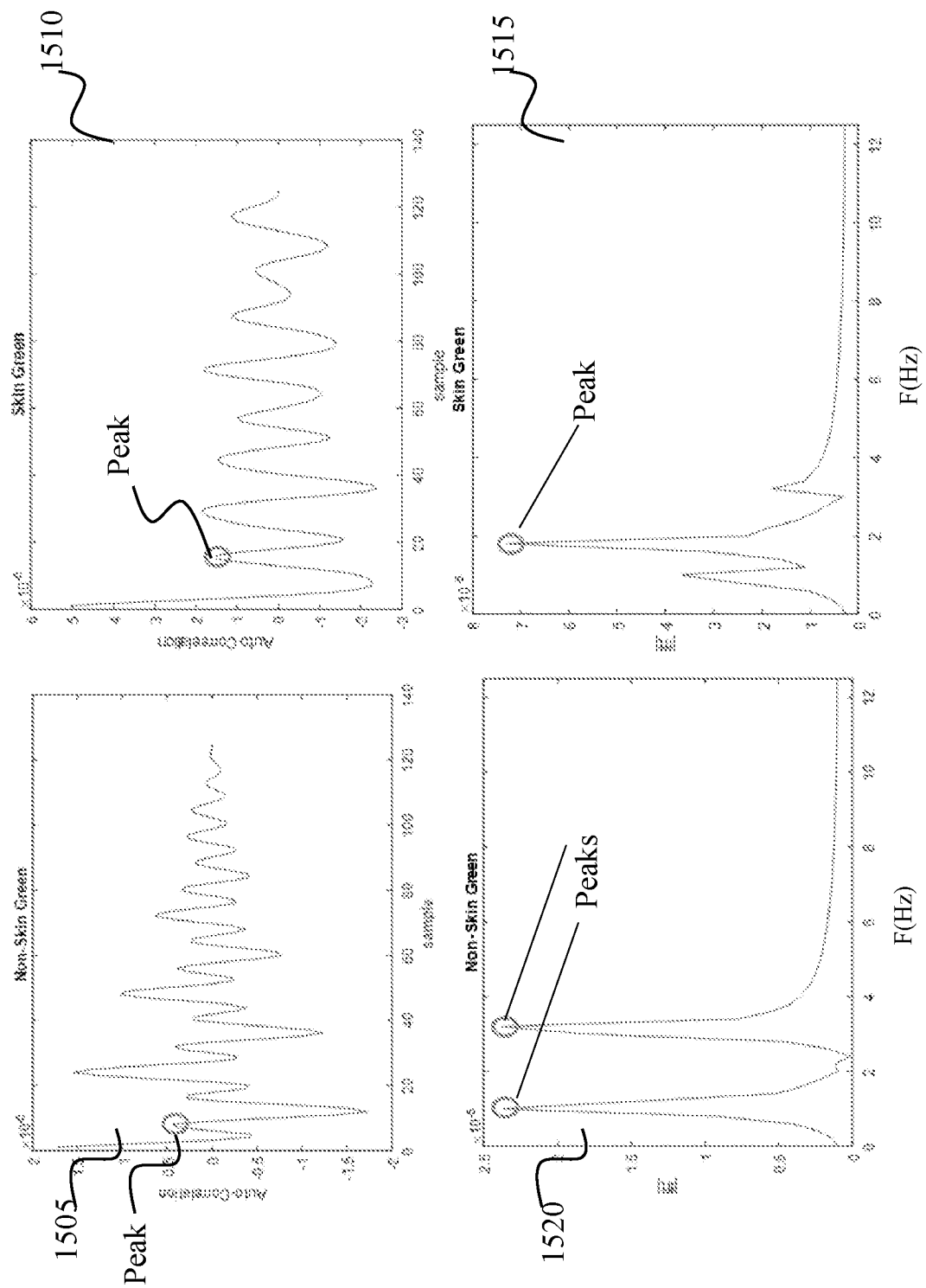
FIG. 15 shows the green channel with auto-correlation analysis as calculated in a training group, in accordance with some embodiments of the present invention.

FIG. 15 shows the green channel with auto-correlation analysis as calculated in a training group, in accordance with some embodiments of the present invention. FIG. 15 shows graphs depicting some intensity values calculated for the green band. Graph 1505 shows a curve of intensity values in a time domain of the green band of the spectral reflectance intensity, as received from a non-skin train group. Graph 1510 shows a curve of intensity values in a time domain of the green band of the spectral reflectance intensity received from a living skin tissue train group.

Graph 1515 shows the intensity frequency values of the green band in the spectral reflectance received from a living skin tissue train group, following autocorrelation as defined in Eq. 18. Graph 1520 shows the intensity frequency values of the green band in the spectral reflectance received from a non-skin train group.

As shown, in some embodiments, the first peak of the non-skin segment detected in the time domain can appear before the skin first peak and the highest peak of the frequency domain detected in the skin which usually corresponding to the heart pulse and appears between 1 Hz and 2.5 Hz.

Figure 16:
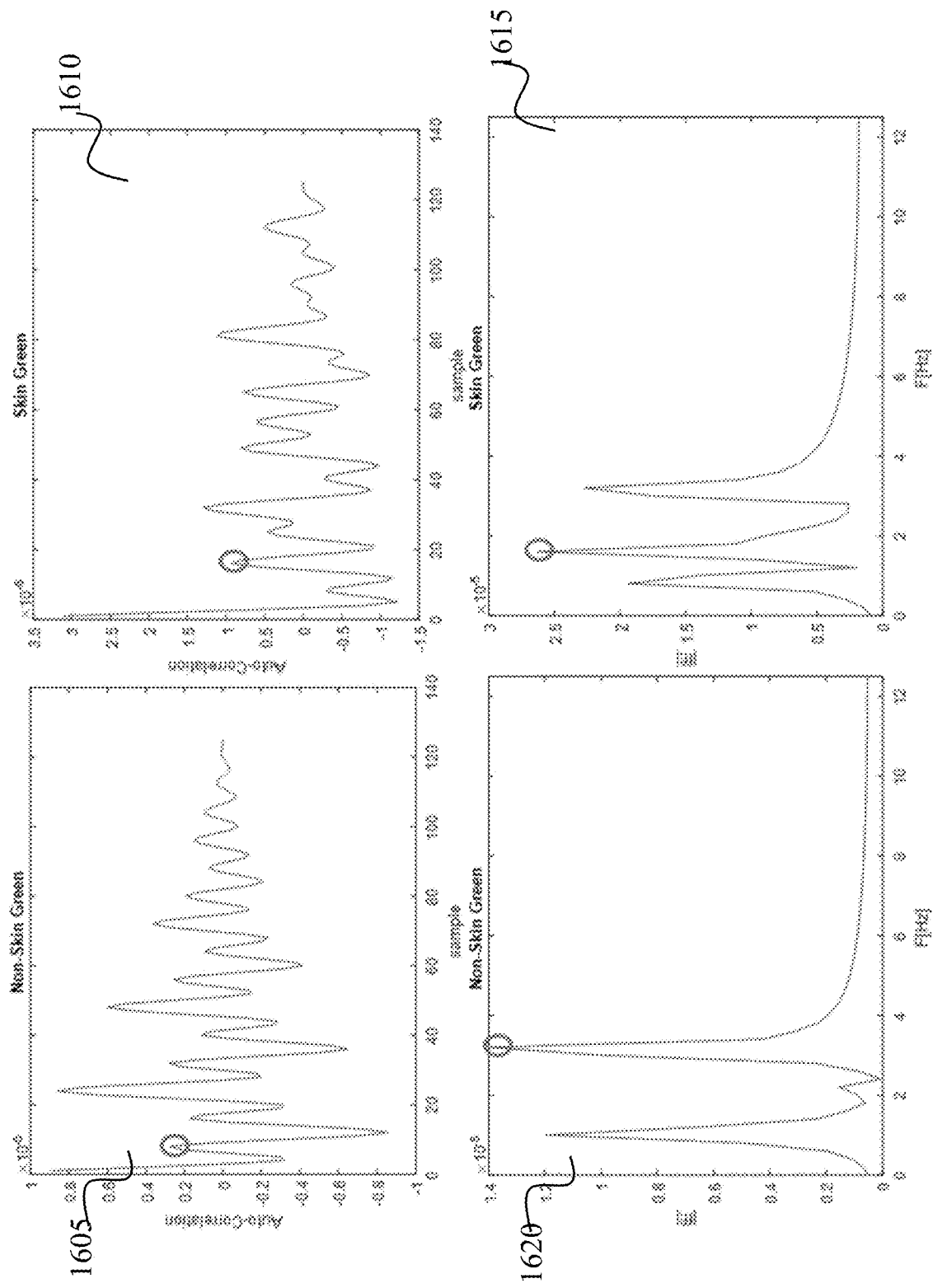
FIG. 16. Shows the green channel with auto-correlation analysis as calculated in a test group, in accordance with some embodiments of the present invention.

FIG. 16. Shows the green channel with auto-correlation analysis as calculated in a test group, in accordance with some embodiments of the present invention. FIG. 16 shows graphs depicting the intensity values of a green channel. Graph 1605 shows curve of intensity values in a time domain of the green band of the spectral reflectance intensity as received from a non-skin test group. Graph 1610 shows a curve of intensity values in a time domain of the green band of the spectral reflectance intensity as received from a living skin tissue test group.

Graph 1615 shows the intensity frequency values of the green band of the spectral reflectance intensity obtained from a living skin tissue test group. Graph 1620 shows the intensity frequency values of the green band in the spectral reflectance intensity received from a non-skin test group.

As shown, the first detected intensity peak of the non-skin segment in the time domain can appear before the skin first peak and the highest peak of the intensity frequency which is usually corresponding to the heart pulse and appearing between 1 HZ and 2.5 Hz.

Tables 3 and 4 below shows possible machine learning algorithm results, for some various test sets, in accordance with some embodiments of the present invention. Table 3 shows the accuracy of the results for a test group, and table 4 shows the accuracy of the results for a picture group.

TABLE 3

Confusion matrix of test group

|  |  | Predictions | |
| --- | --- | --- | --- |
|  |  | Skin | Non-Skin |
| Labels | Skin | 96% | 4% |
|  | Non-Skin | 4% | 86% |

TABLE 4

Confusion matrix of picture group

|  |  | Predictions | |
| --- | --- | --- | --- |
|  |  | Skin | Non-Skin |
| Labels | Skin | 39% | 71% |
|  | Non-Skin | 6% | 98% |

In some embodiments, eight (8) features can be used for the first KNN algorithm. In some embodiments, the training of the algorithm can be with a test set of 128 videos recorded on the laboratory room with the uniform background, and wherein the model is defined with the two prediction groups. For such embodiments, table 5 shows the accuracy of the results for a test group, where in some embodiments, the background comprises variety of colors and objects. Table 6 shows the accuracy of the results for a picture group.

TABLE 5

Confusion matrix of test group

|  |  | Predictions | |
| --- | --- | --- | --- |
|  |  | Skin | Non-Skin |
| Labels | Skin | 96% | 4% |
|  | Non-Skin | 25% | 75% |

TABLE 6

Confusion matrix of picture group

|  |  | Predictions | |
| --- | --- | --- | --- |
|  |  | Skin | Non-Skin |
| Labels | Skin | 69% | 31% |
|  | Non-Skin | 2% | 98% |

Tables 7 and 8 show possible the machine learning algorithm results, for some various test sets, in accordance with some embodiments of the present invention. Table 7 shows the accuracy for the test group and table 8 shows the accuracy for a picture group. In tables 7 and 8, the background can comprise a variety of colors and objects. These videos stream can be added to the training data set, such that the performance can be tested on the same test and pictures groups.

TABLE 7

Confusion matrix of test group

|  |  | Predictions | |
|---|---|---|---|
|  |  | Skin | Non-Skin |
| Labels | Skin | 90% | 10% |
|  | Non-Skin | 12% | 88% |

TABLE 8

Confusion matrix of picture group

|  |  | Predictions | |
|---|---|---|---|
|  |  | Skin | Non-Skin |
| Labels | Skin | 5% | 95% |
|  | Non-Skin | 1% | 99% |

Tables 9 and 10 show the accuracy with different range for each feature which separates between the skin and the non-skin values. Table 9 shows the accuracy for a test group table, and 10 show shows the accuracy for a picture group. In one exemplary case, the training can be with a data set of the variety backgrounds and examine the prediction on the two test groups.

TABLE 9

Confusion matrix of test group

|  |  | Predictions | |
|---|---|---|---|
|  |  | Skin | Non-Skin |
| Labels | Skin | 98% | 2% |
|  | Non-Skin | 10% | 90% |

TABLE 10

Confusion matrix of picture group

|  |  | Predictions | |
|---|---|---|---|
|  |  | Skin | Non-Skin |
| Labels | Skin | 25% | 75% |
|  | Non-Skin | 1% | 99% |

Table 11 below shows final model performance.

TABLE 11

Final model performance.

| Sensitivity (Se) | 97.8% |
| Positive Predictive Value (PPV) | 90.4% |
| Specificity (Sp) | 89.5% |
| Negative Predictive Value (NPV) | 97.6% |
| Total Classification Accuracy (TCA) | 93.7% |

Figure 17A:
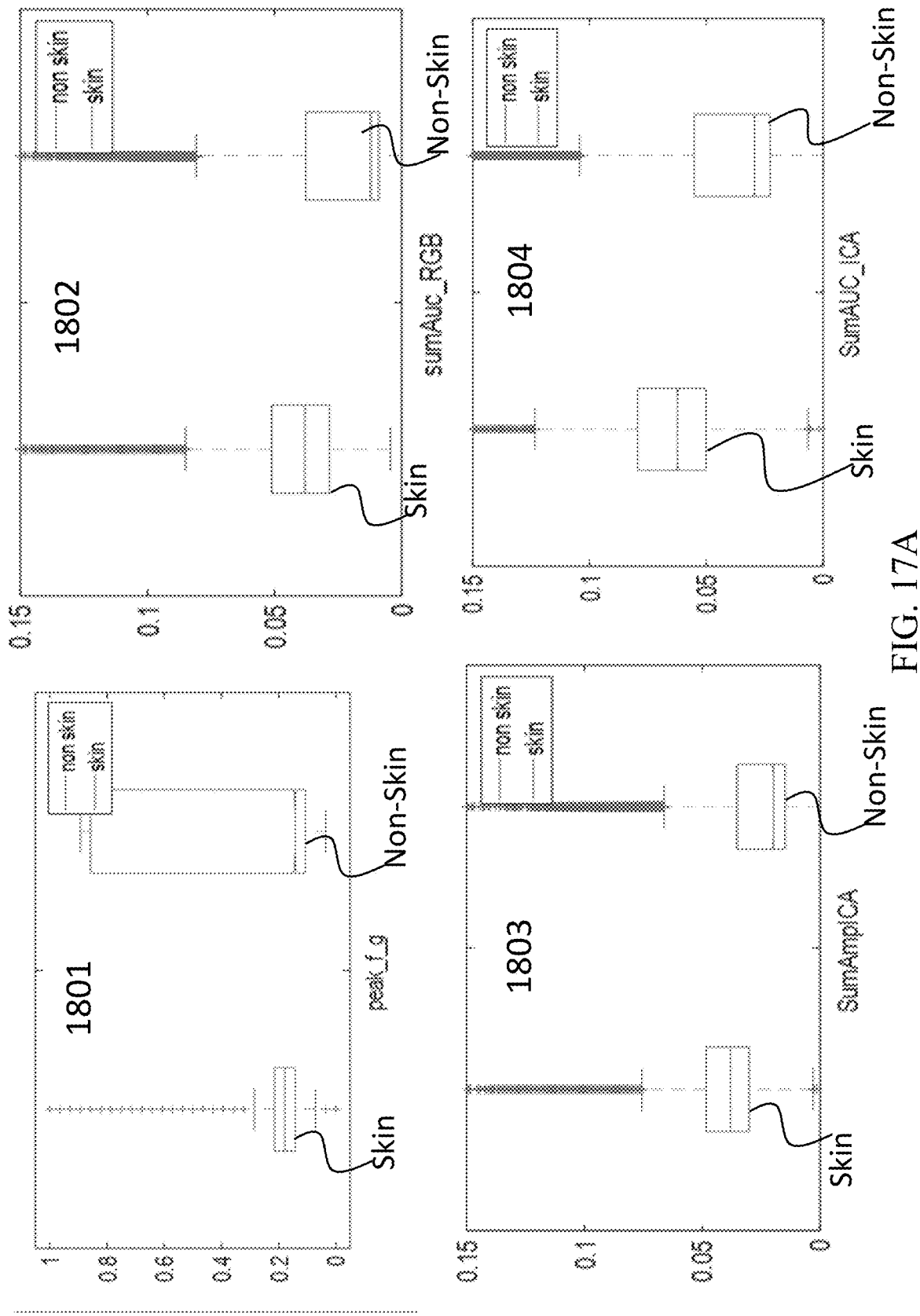
FIGS. 17A-17E show possible results of a comparison between the results of the feature calculation, in skin and non-skin test sets, according to some embodiments of the present invention.
Figure 17B:
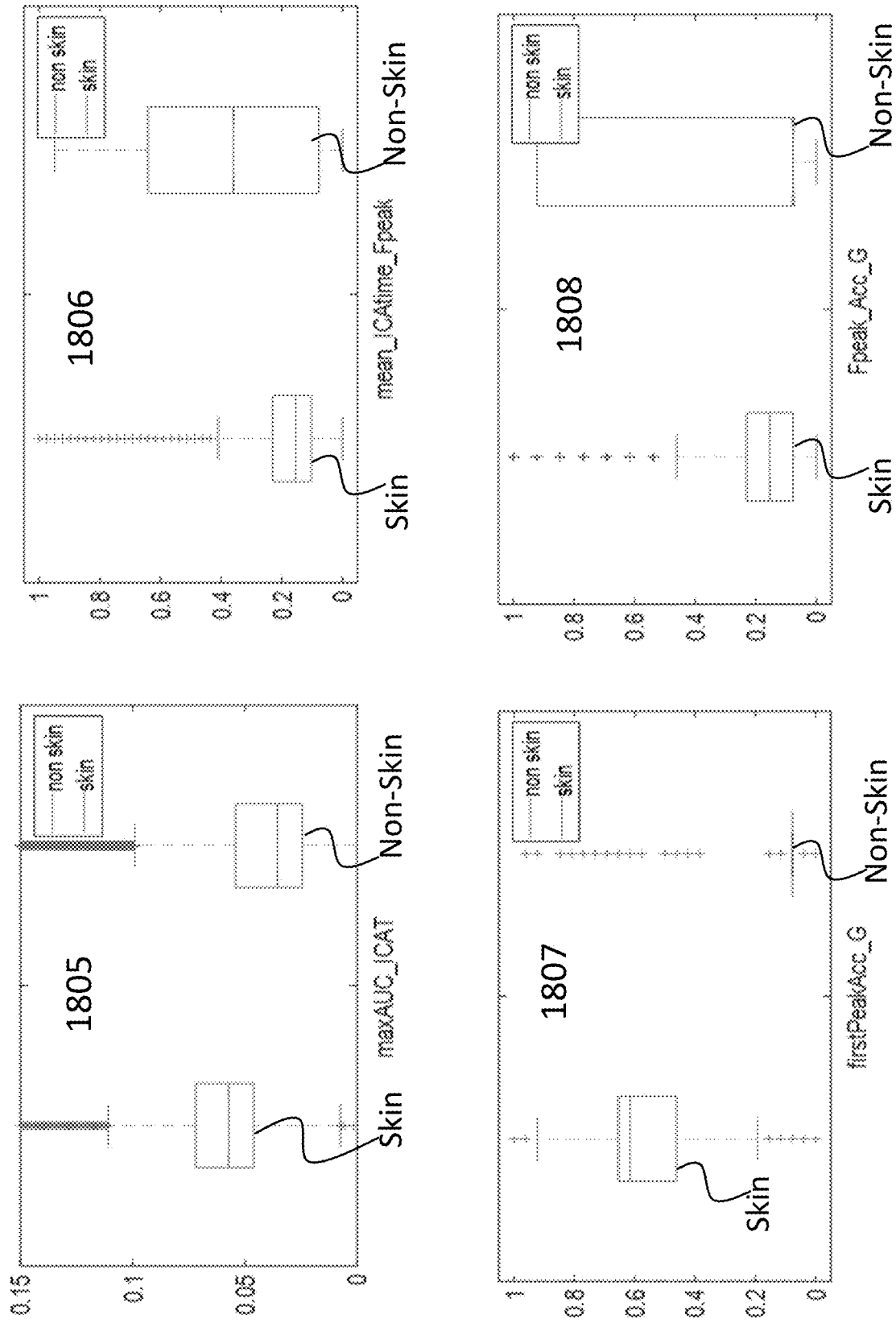
Figure 17C:
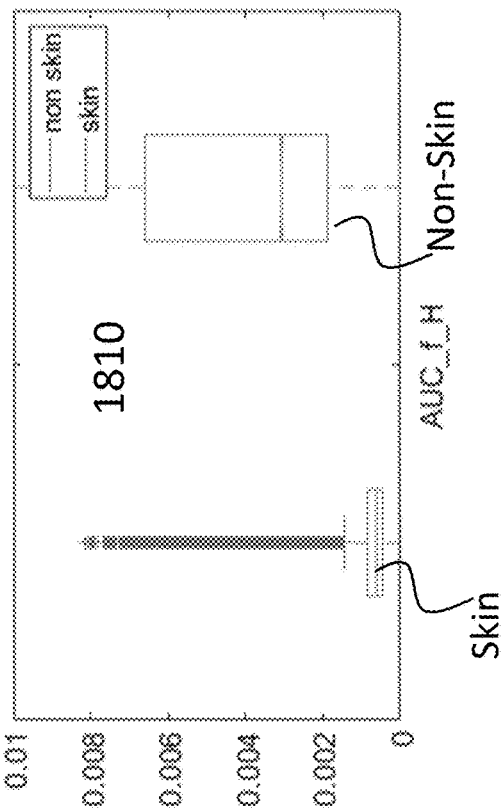
Figure 17C:
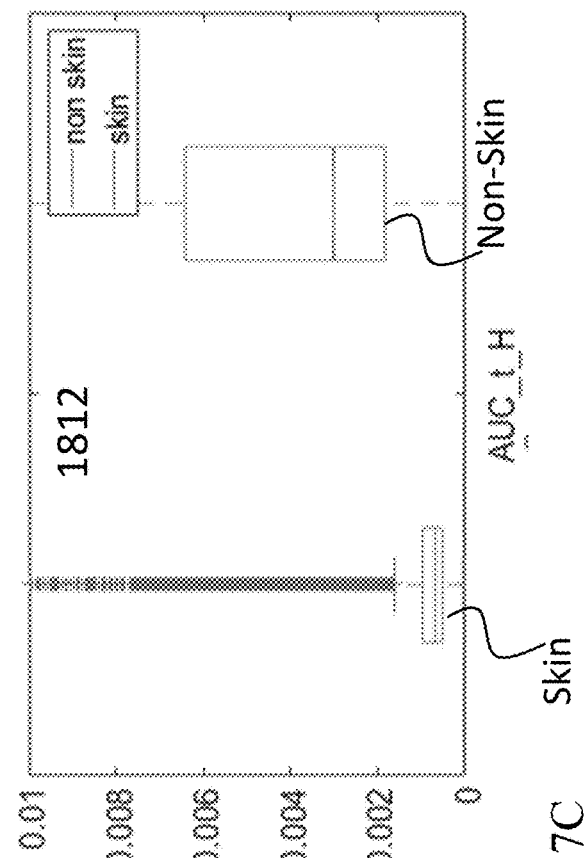
Figure 17C:
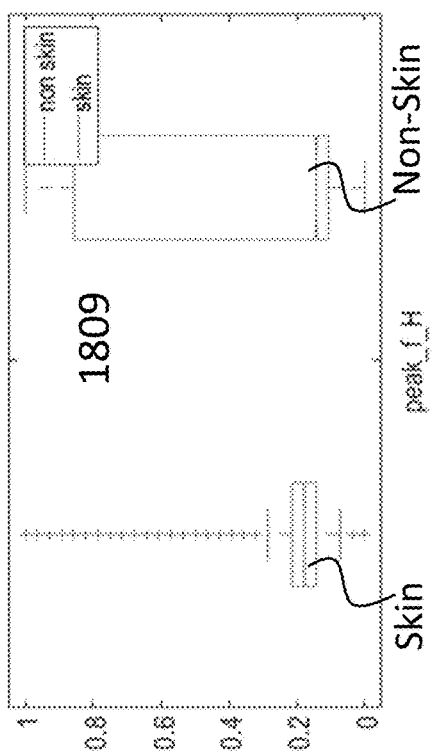
Figure 17C:
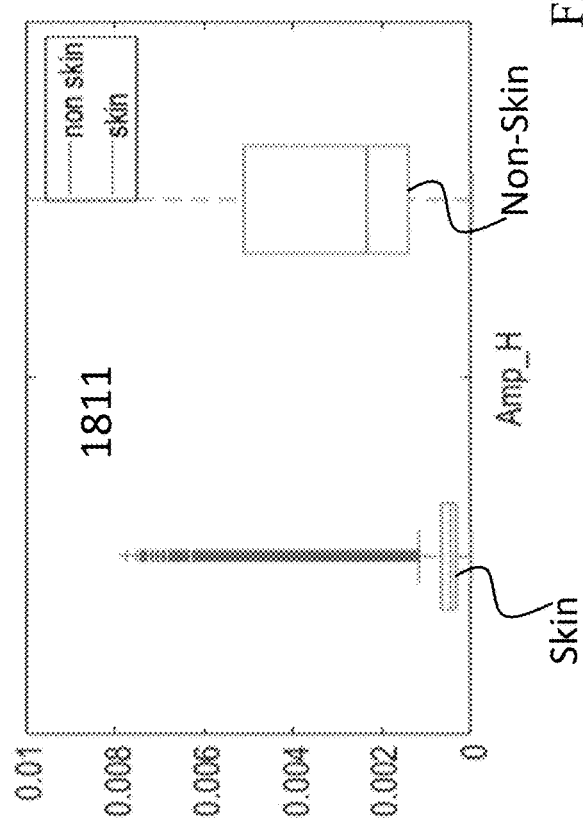
Figure 17D:
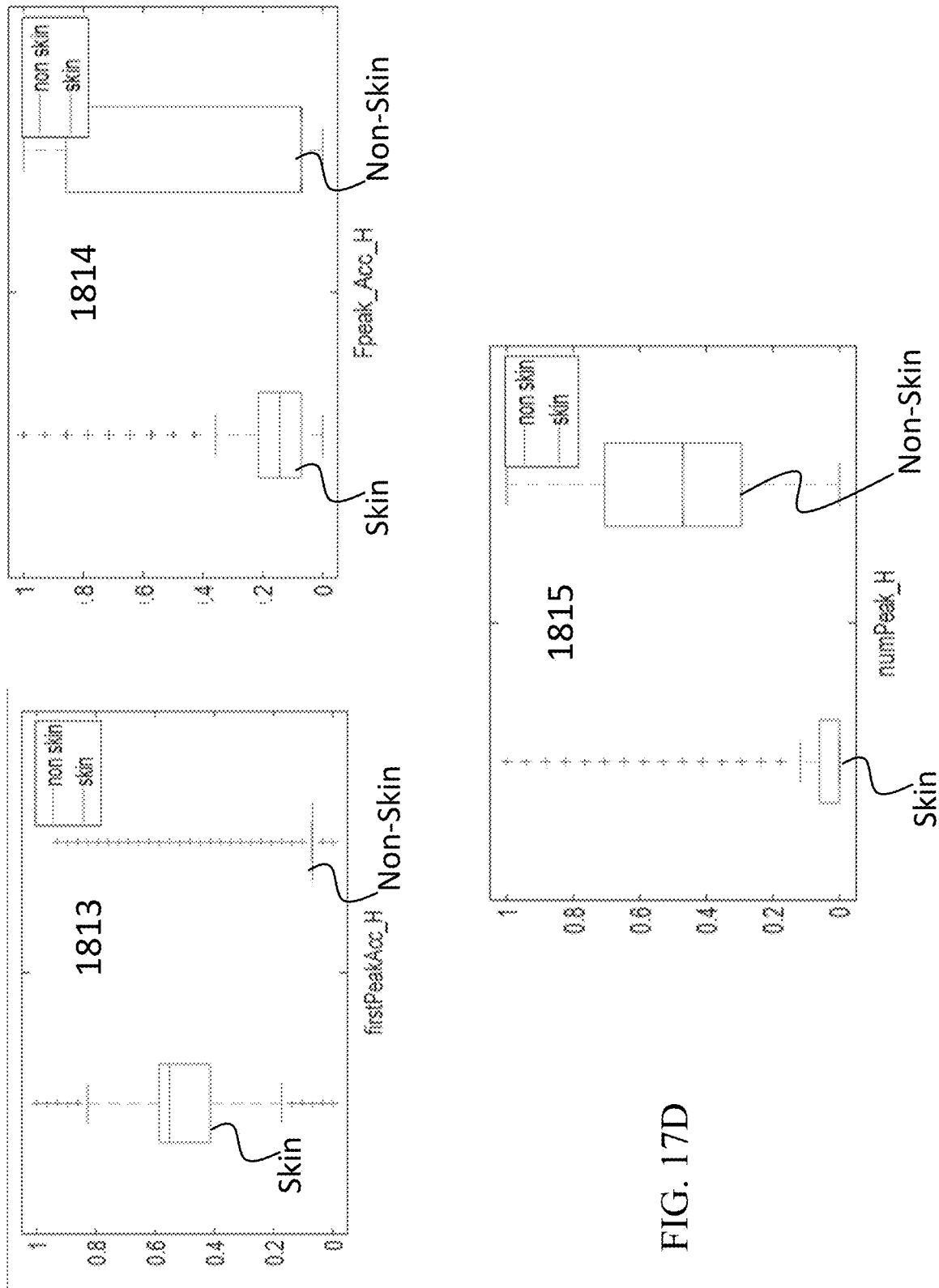
Figure 17E:
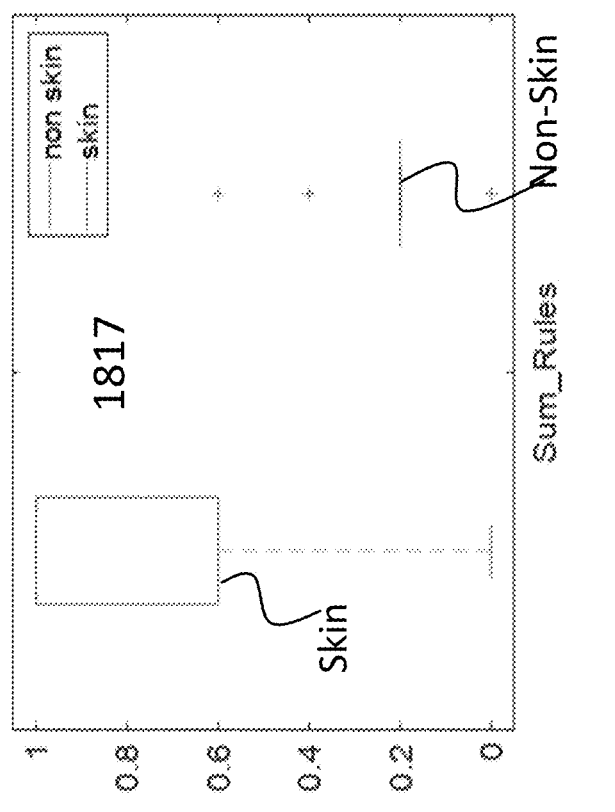
Figure 17E:
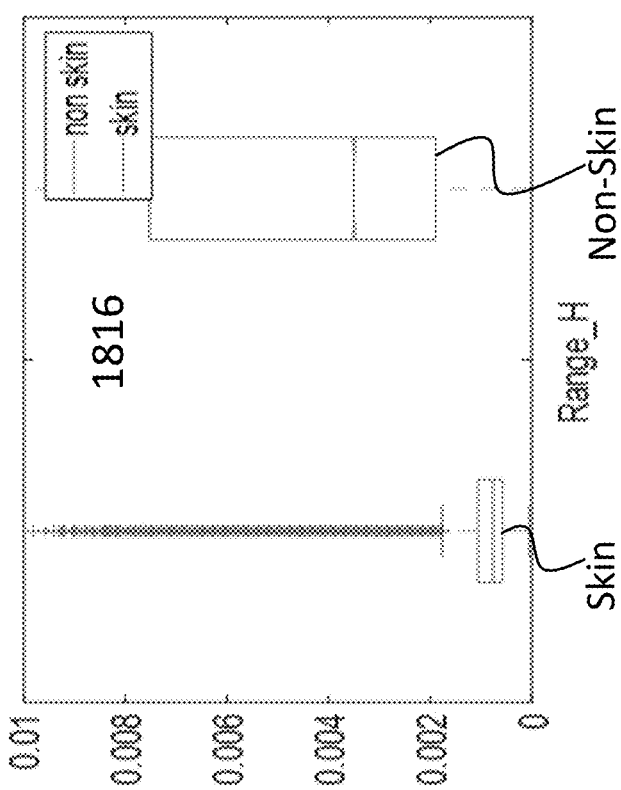
Figure 18A:
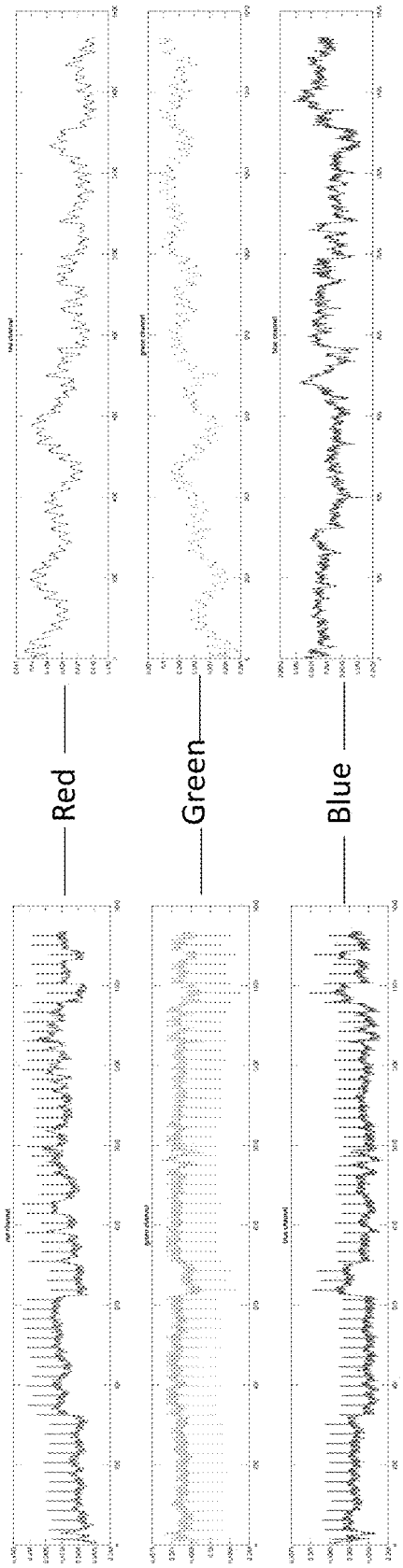
FIGS. 18A-18C show RGB mean values calculated for different segments, according to some exemplary embodiments of the present disclosure.
Figure 18B:
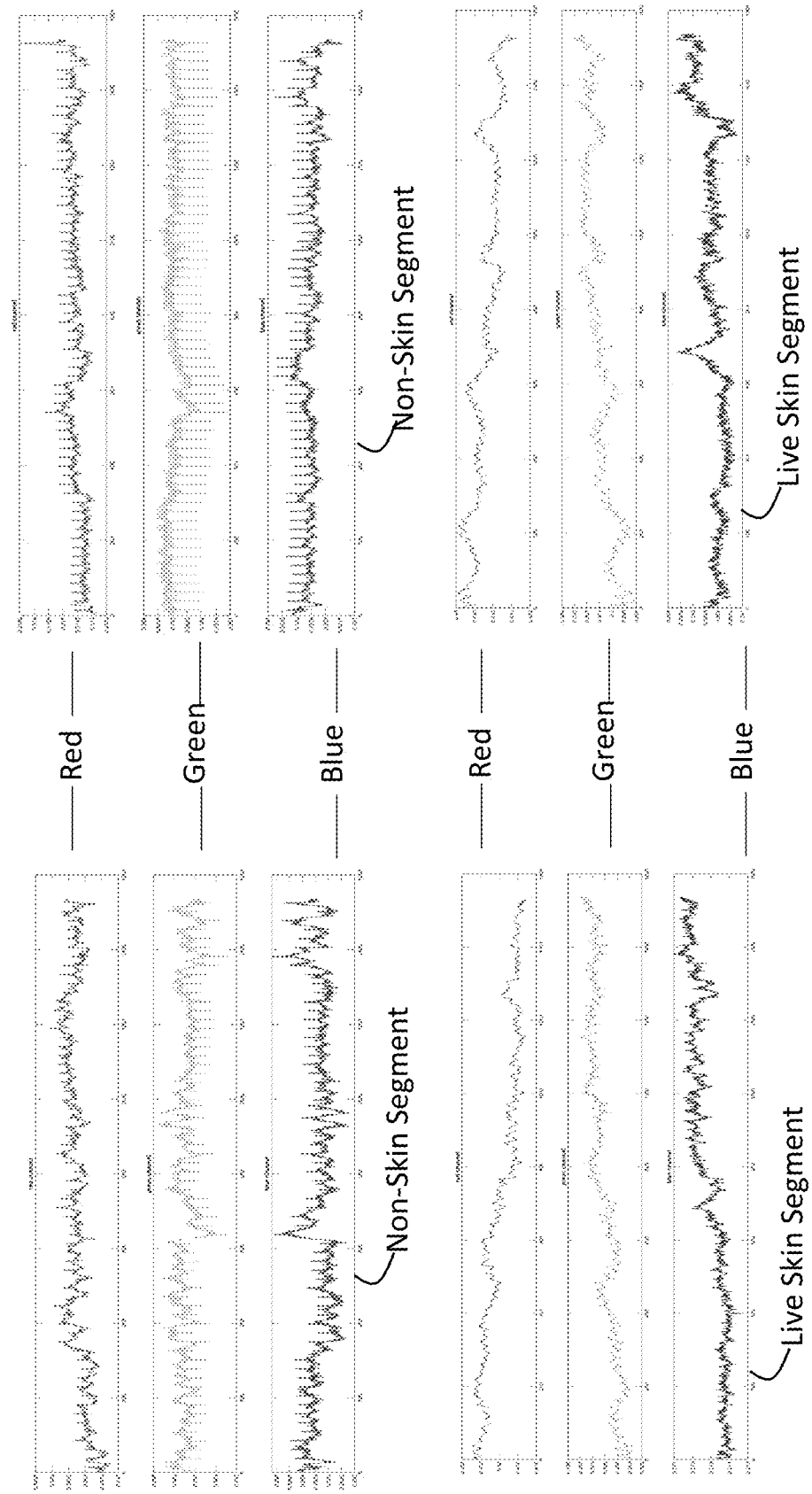
Figure 18C:
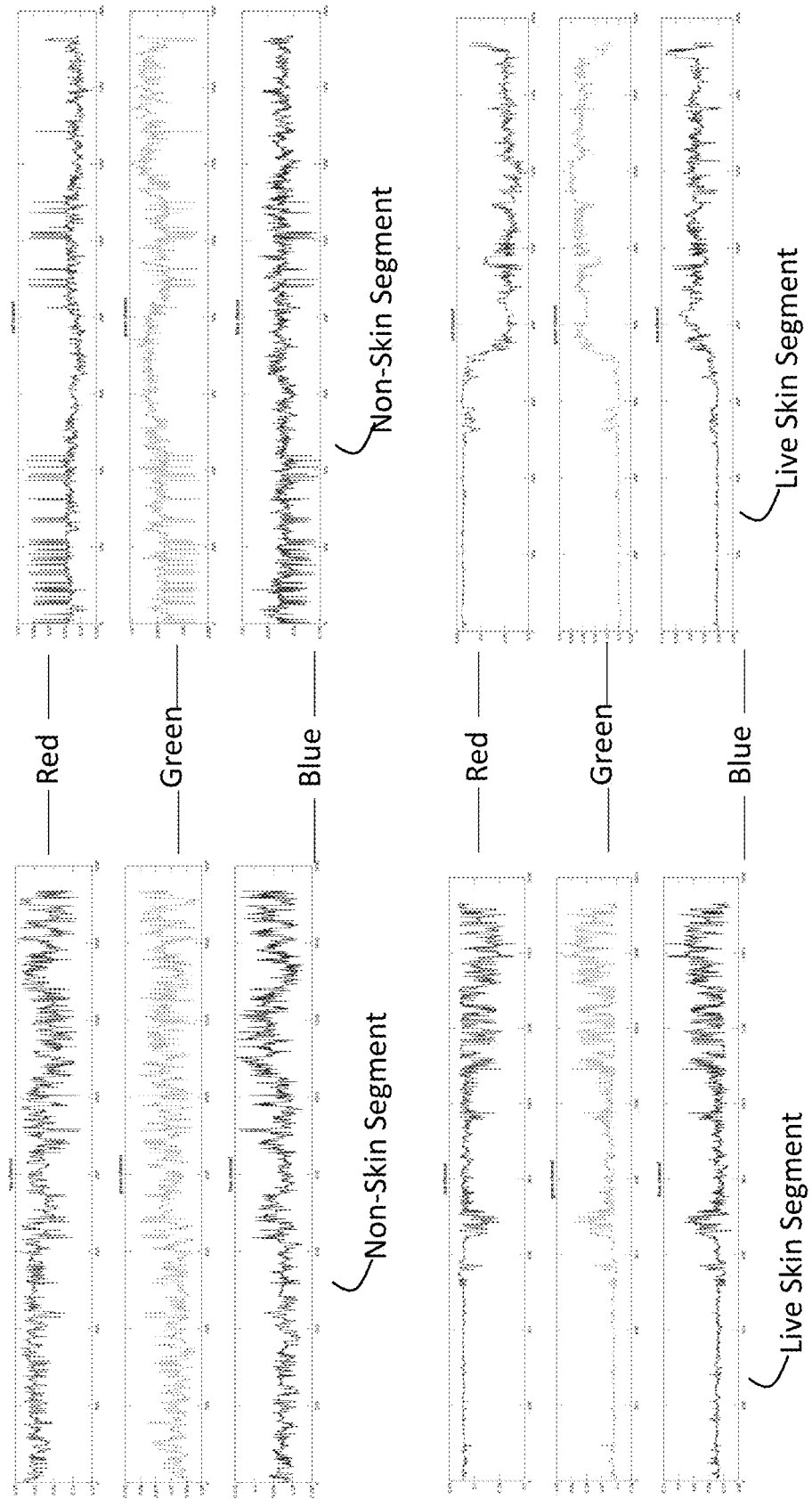

FIGS. 17A-17E show possible results of a comparison between the results of the feature calculation, in skin and non-skin test sets, according to some embodiments of the present invention;

FIGS. 17A-17C show RGB mean values calculated for different segments, according to some exemplary embodiments of the present disclosure.

FIG. 17A shows RGB mean values calculated a background segment and face segment.

FIG. 17B shows RGB mean values calculated for two non-skin and two skin permanent-size segments.

FIG. 17C shows RGB mean values calculated mean for two non-skin and for two skin superpixel segments, according to method.

Table 12 below shows median values of the at least some of features, e.g., first eight features, in three different segmentation method, as received by applying a machine learning classifier to the extracted features, according to one exemplary embodiment. Table 12 shows the results for method (i), method (ii), and method (iii).

TABLE 12

Differences in feature values in each method

|  | First check | | Second check | | Third check | |
|---|---|---|---|---|---|---|
| Feature name | skin | non | skin | non | skin | non |
| $peak_F\_g$ | 1.19 | 1.09 | 1.19 | 1.09 | 1.19 | 1.19 |
| $sum\_AUC_f\_rgb$ | 0.032 | 0.021 | 0.027 | 0.022 | 0.68 | 0.36 |
| $sum\_Amp_t\_ICA$ | 0.0022 | 0.0013 | 0.0019 | 0.0015 | 0.049 | 0.022 |
| $sum\_AUC_t\_ICA$ | 0.0022 | 0.0012 | 0.0017 | 0.0013 | 0.029 | 0.017 |
| $max\_AUC_t\_ICA$ | 0.0009 | 0.0006 | 0.0007 | 0.0006 | 0.014 | 0.0008 |
| $Mean\_ICA\_peak_F$ | 0.59 | 0.86 | 0.59 | 0.83 | 0.69 | 0.69 |
| $first\_peak\_t\_Corr\_g$ | 21 | 8 | 22 | 8 | 9 | 10 |
| $F_{Peak}\_Corr\_g$ | 1.2 | 1 | 1.2 | 1 | 1.2 | 1.2 |

Additionally, in some embodiments, the differences between uniform color segments and un-uniform color segments, the uniform color background segments have different patterns than an un-uniform color background segment. In some embodiments, the differences can be manifested in time domain related features. The time domain related features can be calculated after the signals projection to another space (ICA), so the projection changes when the signal is received from an un-uniform segment. In some embodiments, the un-uniform background the features values can be like the skin features values.

In some embodiments, by adding more videos of un-uniform background to the training set the model can be able separating between the un-uniform background segment and the skin segment. One exemplary case can be with a training process on eight (8) video streams (four un-uniform backgrounds, and four uniform backgrounds,) and a test process on an un-uniform video to ensure that the segmentation method can handle this solution.

Table 13 below shows results as received by applying a machine learning classifier to features extracted from permanent sized segments, according to one exemplary embodiment.

TABLE 13

Skin and non-skin predictions in different segmentations size

| Segment Size | Skin Classified as Skin | Non-Skin Classified as Skin | Non-Skin Classified as Non-Skin |
|---|---|---|---|
| 108 × 192 | 90% | 1.1% | 98.9% |
| 78 × 138 | 92.8% | 2.2% | 97.8% |
| 4 × 96 | 95.1% | 4.9% | 93.7% |
| 45 × 80 | 92.1% | 7.8% | 97.56% |
| 39 × 69 | 91.4% | 86% | 96.5% |

In some embodiments, the skin prediction can be more accurate as the segment size growing smaller. In some cases, wherein the rectangles location more accurate on the face, the prediction rate may grow. In some embodiments, the rate of incorrect classification of non-skin segments as skin segments grows up as the segment size get smaller.

Figure 19:
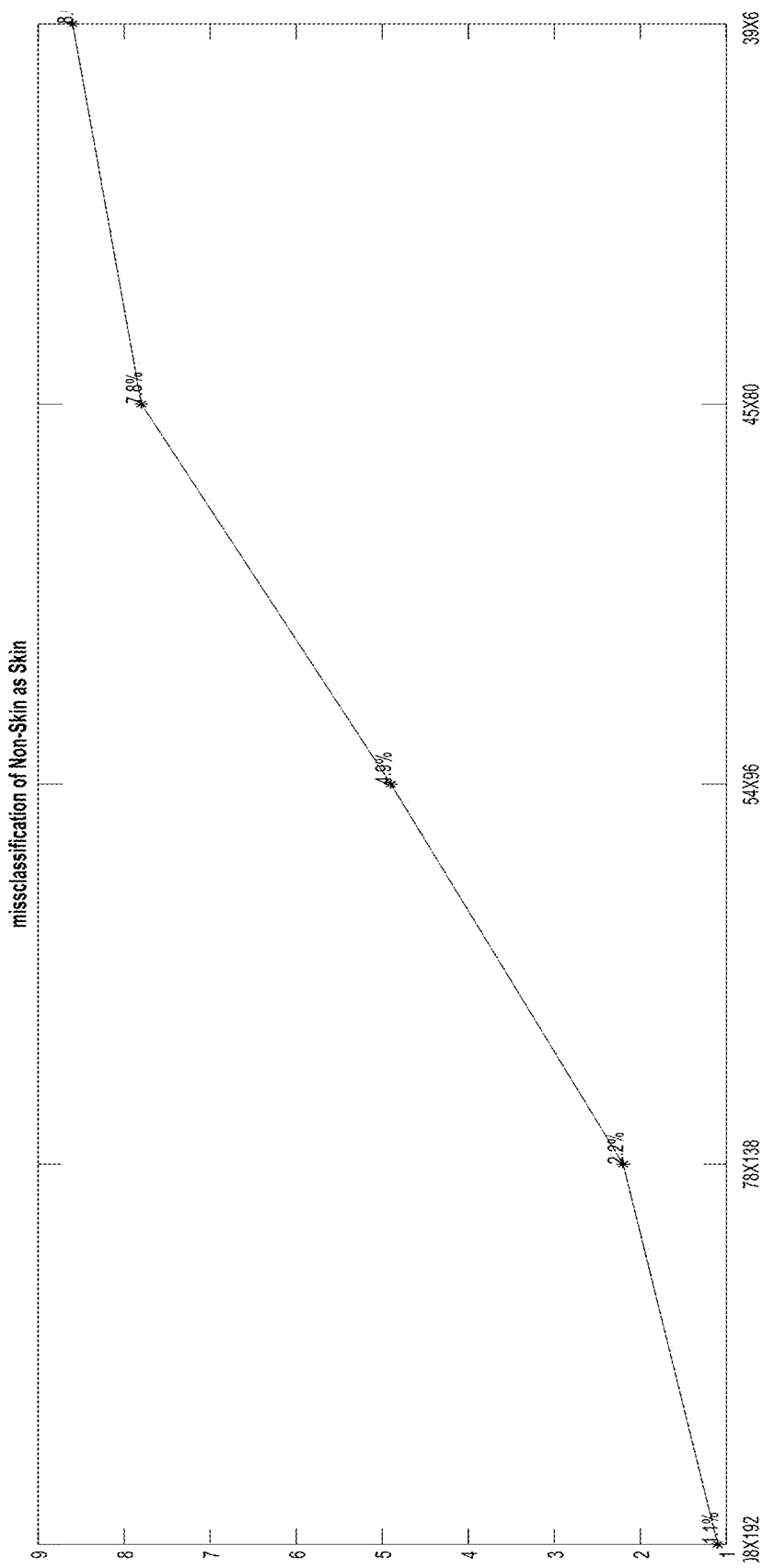
FIG. 19 shows a rate classification of non-skin segments as skin segments, versus the segment size, according to some exemplary embodiments of the present disclosure.

FIG. 19 shows a rate of possible classification results of non-skin segments as skin segments, versus the segment size, according to some exemplary embodiments of the present disclosure. FIG. 19 shows that the prediction stabilizes and enter to saturation in the segment size of 45×80.

In some embodiments, the percentage of incorrect predictions can grow as the number of pixels in each segment are diminishing. Accordingly, in some embodiments, a dependency on the number of pixels per segment in the non-skin segment can be found.

In some embodiments, all 17 features may be used in the feature extraction phase. Such a feature extraction of all 17 can provide high level of performance. In some embodiments, a separation between face and background may require to increase the machine learning accuracy level. In some cases, reducing the size of the segments increases the accuracy level, in at least a part of the segment types (e.g., non-skin segments, and skin segments).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was selected to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A system comprising:
   at least one hardware processor; and
   a non-transitory computer-readable storage medium having stored thereon program code, the program code executable by the at least one hardware processor to:
   receive, as input, a video sequence comprising a plurality of frames and depicting a scene,
   detect, in each of said frames, one or more regions of interest (ROI) associated with an object in said scene,
   extract, from each of said ROIs with respect to all of said frames, a feature set representing spectral reflectance,
   at a training stage, train a machine learning classifier on a training set comprising:
   (i) all of said feature sets, and
   (ii) labels indicating whether each of said ROIs depicts living skin tissue, and
   at an inference stage, apply said trained machine learning classifier to a target feature set extracted from a target ROI detected in a target video sequence, to determine whether said ROI depicts living skin tissue,
   wherein said extracting comprises any one of:
   calculating image data values in an RGB (red-green-blue) color representation model, wherein said features comprise at least some of: frequency peak for at least one RGB channel; area under curve (AUC) for at least one RGB channel in the frequency domain; independent component analysis (ICA) for each RGB channel; maximum amplitude range for ICA in at least one RGB channel; AUC for ICA in at least one RGB channel in the time domain; frequency peak for ICA in at least one RGB channel, in the frequency domain; time index associated with an autocorrelation signal for at least one RGB channel; frequency peak associated with an autocorrelation signal for at least one RGB channel in the frequency domain; and
   calculating image data values in an HSV (hue, saturation, value) color representation model, wherein said features comprise at least some of: Frequency peak for at least one HSV channel; area under curve (AUC) for at least one HSV channel in the frequency domain; maximum amplitude range for at least one HSV channel in the time domain; AUC for at least one HSV channel in the time domain; time index associated with an autocorrelation signal for at least one HSV channel; frequency peak associated with an autocorrelation signal for at least one HSV channel in the frequency domain; number of peaks above a specified threshold for at least one HSV channel in the time domain; and amplitude range for at least one HSV channel in the time domain.

2. The system of claim 1, wherein each of said ROIs depicts at least one of: a human; part or whole of a human facial region; a skin region in a human; and a background region in said scene.

3. The system of claim 1, wherein each of said ROIs is further segmented into a plurality of segments based on one of: pixel similarity parameter, superpixel methods, and a fixed grid.

4. The system of claim 3, wherein said segments are tracked in said video sequence.

5. A method comprising:
   receiving, as input, a video sequence comprising a plurality of frames and depicting a scene;
   detecting, in each of said frames, one or more regions of interest (ROI) associated with an object in said scene;

extracting, from each of said ROIs with respect to all of said frames, a feature set representing spectral reflectance;

at a training stage, train a machine learning classifier on a training set comprising:
(i) all of said feature sets, and
(ii) labels indicating whether each of said ROIs depicts living skin tissue; and at an inference stage, applying said trained machine learning classifier to a target feature set extracted from a target ROI detected in a target video sequence, to determine whether said ROI depicts living skin tissue, wherein said extracting comprises any one of:
calculating image data values in an RGB (red-green-blue) color representation model, wherein said features comprise at least some of: frequency peak for at least one RGB channel; area under curve (AUC) for at least one RGB channel in the frequency domain; independent component analysis (ICA) for each RGB channel; maximum amplitude range for ICA in at least one RGB channel; AUC for ICA in at least one RGB channel in the time domain; frequency peak for ICA in at least one RGB channel, in the frequency domain; time index associated with an autocorrelation signal for at least one RGB channel; frequency peak associated with an autocorrelation signal for at least one RGB channel in the frequency domain; and calculating image data values in an HSV (hue, saturation, value) color representation model, wherein said features comprise at least some of: Frequency peak for at least one HSV channel; area under curve (AUC) for at least one HSV channel in the frequency domain; maximum amplitude range for at least one HSV channel in the time domain; AUC for at least one HSV channel in the time domain; time index associated with an autocorrelation signal for at least one HSV channel; frequency peak associated with an autocorrelation signal for at least one HSV channel in the frequency domain; number of peaks above a specified threshold for at least one HSV channel in the time domain; and amplitude range for at least one HSV channel in the time domain.

6. The method of claim 5, wherein each of said ROIs depicts at least one of: a human; part or whole of a human facial region; a skin region in a human; and a background region in said scene.

7. The method of claim 5, wherein each of said ROIs is further segmented into a plurality of segments based on one of: pixel similarity parameter, superpixel methods, and a fixed grid.

8. The method of claim 7, wherein said segments are tracked in said video sequence.

9. A computer program product comprising a non-transitory computer-readable storage medium having program code embodied therewith, the program code executable by at least one hardware processor to:

receive, as input, a video sequence comprising a plurality of frames and depicting a scene;

detect, in each of said frames, one or more regions of interest (ROI) associated with an object in said scene;

extract, from each of said ROIs with respect to all of said frames, a feature set representing spectral reflectance, at a training stage, train a machine learning classifier on a training set comprising:
(i) all of said feature sets, and
(ii) labels indicating whether each of said ROIs depicts living skin tissue; and at an inference stage, apply said trained machine learning classifier to a target feature set extracted from a target ROI detected in a target video sequence, to determine whether said ROI depicts living skin tissue, wherein said extracting comprises any one of:
calculating image data values in an RGB (red-green-blue) color representation model, wherein said features comprise at least some of: frequency peak for at least one RGB channel; area under curve (AUC) for at least one RGB channel in the frequency domain; independent component analysis (ICA) for each RGB channel; maximum amplitude range for ICA in at least one RGB channel; AUC for ICA in at least one RGB channel in the time domain; frequency peak for ICA in at least one RGB channel, in the frequency domain; time index associated with an autocorrelation signal for at least one RGB channel; frequency peak associated with an autocorrelation signal for at least one RGB channel in the frequency domain; and calculating image data values in an HSV (hue, saturation, value) color representation model, wherein said features comprise at least some of: Frequency peak for at least one HSV channel; area under curve (AUC) for at least one HSV channel in the frequency domain; maximum amplitude range for at least one HSV channel in the time domain; AUC for at least one HSV channel in the time domain; time index associated with an autocorrelation signal for at least one HSV channel; frequency peak associated with an autocorrelation signal for at least one HSV channel in the frequency domain; number of peaks above a specified threshold for at least one HSV channel in the time domain; and amplitude range for at least one HSV channel in the time domain.

10. The computer program product of claim 9, wherein each of said ROIs depicts at least one of: a human; part or whole of a human facial region; a skin region in a human; and a background region in said scene.

11. The computer program product of claim 9, wherein each of said ROIs is further segmented into a plurality of segments based on one of: pixel similarity parameter, superpixel methods, and a fixed grid.

* * * * *